US012719628B2

(12) United States Patent
Abotabl et al.

(10) Patent No.: US 12,719,628 B2
(45) Date of Patent: Aug. 25, 2026

(54) INTERLEAVING ACROSS CBGS AND ENHANCED MAPPING FOR SBFD SLOTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 18/295,228

(22) Filed: Apr. 3, 2023

(65) Prior Publication Data

US 2024/0333444 A1 Oct. 3, 2024

(51) Int. Cl.
*H04L 5/00* (2006.01)
*H04L 1/00* (2006.01)
*H04L 5/14* (2006.01)

(52) U.S. Cl.
CPC .......... *H04L 5/0044* (2013.01); *H04L 1/0057* (2013.01); *H04L 1/0071* (2013.01); *H04L 5/14* (2013.01)

(58) Field of Classification Search
CPC ... H04L 5/0044; H04L 1/0057; H04L 1/0071; H04L 5/14
See application file for complete search history.

(56) References Cited

U.S. PATENT DOCUMENTS

2018/0167932 A1* 6/2018 Papasakellariou .... H04L 1/1887
2020/0092047 A1* 3/2020 Yeo ........................ H04W 72/23
2020/0304251 A1* 9/2020 Pinayour Chandrasekaran .......... H04L 1/1809
2021/0044384 A1* 2/2021 Sengupta .............. H04L 1/0045
2021/0242983 A1* 8/2021 Yoshimura ............ H04L 1/0071
2021/0281381 A1* 9/2021 Wu ...................... H04L 27/0006
2024/0048422 A1* 2/2024 Frenne ................. H04B 7/0696
2024/0195583 A1* 6/2024 Yang ....................... H04L 5/001
2024/0235744 A1* 7/2024 Cao ........................ H04L 1/0041
2024/0323961 A1* 9/2024 Liu ....................... H04L 5/0044

* cited by examiner

*Primary Examiner* — Oussama Roudani
(74) *Attorney, Agent, or Firm* — Procopio, Cory, Hargreaves & Savitch

(57) ABSTRACT

A transmitting device may generate a plurality of CBs. The plurality of CBs may be grouped into a plurality of CBGs. The transmitting device may interleave the plurality of CBs across the plurality of CBGs to construct a channel. The transmitting device may map the channel to one or more time-frequency resources associated with an allocation. The transmitting device may transmit, for a receiving device, the mapped channel using the one or more time-frequency resources. The receiving device may recover a plurality of CBs from the channel. The receiving device may deinterleave the plurality of CBs to recover a plurality of CBGs. The receiving device may decode the deinterleaved plurality of CBs based on the recovered plurality of CBGs.

30 Claims, 16 Drawing Sheets

400
frequency
time
DL
404
UL
402
DL communication 410
frequency
time
DL
414
UL
412
UL communication 420
frequency
time
DL
424
UL
426
422
Guard band

700

704a

CB order without interleaving 1 2 3 4 5 6 7 8

704b

CB order with interleaving for mapping into VRBs/PRBs 1 7 6 4 5 3 2 8

CBG 1 702a

CBG 2 702b

CBG 3 702c

CBG 4 702d

706a

UL 708

DL 710 with no interleaving

706b

UL 708

DL 710 with CB index interleaving

INTERLEAVING ACROSS CBGS AND ENHANCED MAPPING FOR SBFD SLOTS

TECHNICAL FIELD

The present disclosure relates generally to communication systems, and more particularly, to resource mapping for a subband full-duplex (SBFD) operation in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a transmitting device. The apparatus may generate a plurality of code blocks (CBs). The plurality of CBs may be grouped into a plurality of code block groups (CBGs). The apparatus may interleave the plurality of CBs across the plurality of CBGs to construct a channel. The apparatus may map the channel to one or more time-frequency resources associated with an allocation. The apparatus may transmit, for a receiving device, the mapped channel using the one or more time-frequency resources.

In an aspect of the disclosure, a method, a computer-readable medium, and an apparatus are provided. The apparatus may be a receiving device. The apparatus may receive a signal corresponding to a channel via one or more time-frequency resources associated with an allocation from a transmitting device. The apparatus may recover a plurality of CBs from the channel. The apparatus may deinterleave the plurality of CBs to recover a plurality of CBGs. The apparatus may decode the deinterleaved plurality of CBs based on the recovered plurality of CBGs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
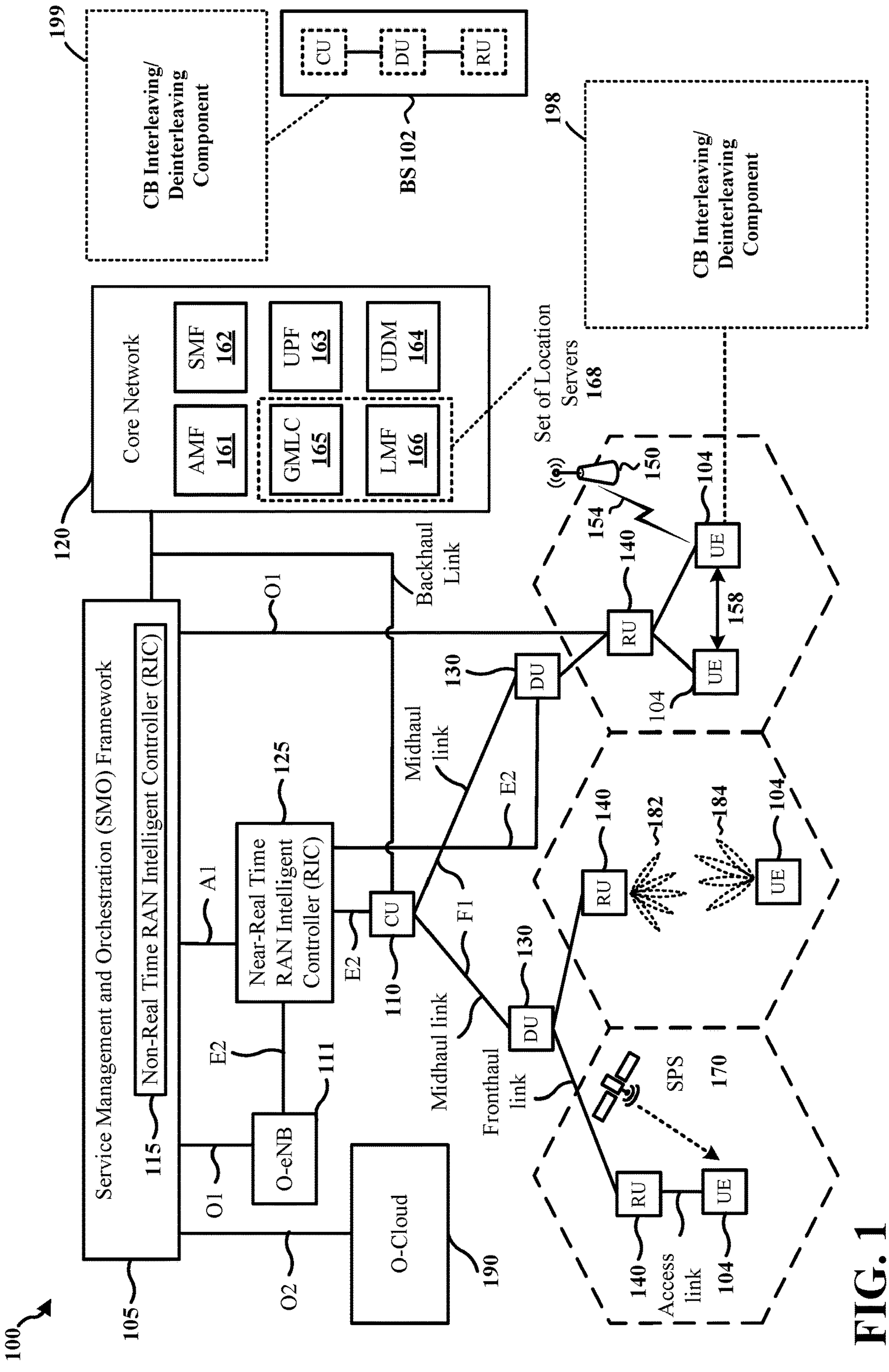
FIG. 1 is a diagram illustrating an example of a wireless communications system and an access network.

SBFD slots may have two disjoint DL allocations or two disjoint UL allocations. The two disjoint DL/UL (sub)bands may be separated by a UL/DL (sub)band (e.g., a large UL/DL (sub)band) (e.g., two disjoint DL (sub)bands may be separated by a UL (sub)band, or two disjoint UL (sub)bands may be separated by a DL (sub)band) in addition to any guard bands. A transmission of a DL signal/channel (e.g., by a base station) on the (sub)band edge that is close to the UL (sub)band may suffer from interference (e.g., cross-link interference (CLI) and/or self-interference). Similarly, a transmission of a UL signal/channel (e.g., by a UE) on the (sub)band edge that is close to the DL (sub)band may also suffer from interference. Accordingly, the resource blocks (RBs) closer to the subband edge may be associated with lower (less) channel quality. In general, channel mapping for the PDSCH or the PUSCH may occur in frequency first then in time (i.e., the mapping process may map, sequentially, for a same symbol, modulation symbols to RBs in the order of lower frequency RBs to higher frequency RBs, before the mapping process continues onto the next symbol). In some cases, some CBGs may be mapped closer to the subband edge than other CBGs. Such uneven mapping of the CBGs may lead to higher chances of error in some CBGs (i.e., in CBGs closer to the subband edge).

Various aspects relate generally to CB index interleaving that may ensure that the CBs that belong to the same CBG may be spread across the band allocation (e.g., across the entire bandwidth of the allocation). In some examples, a transmitting device may generate a plurality of CBs. The plurality of CBs may be grouped into a plurality of CBGs. The transmitting device may interleave the plurality of CBs across the plurality of CBGs to construct a channel. The transmitting device may map the channel to one or more time-frequency resources associated with an allocation. The transmitting device may transmit, for a receiving device, the mapped channel using the one or more time-frequency resources. The receiving device may recover a plurality of CBs from the channel. The receiving device may deinterleave the plurality of CBs to recover a plurality of CBGs. The receiving device may decode the deinterleaved plurality of CBs based on the recovered plurality of CBGs.

Particular aspects of the subject matter described in this disclosure can be implemented to realize one or more of the following potential advantages. In some examples, the described techniques can be used to achieve a similar error rate for all CBGs included in the SBFD operation. In particular, as the multiple CBGs may be spread evenly in the resources across the bandwidth of the allocation, the multiple CBGs may not suffer from uneven error rates that may be caused by the resources having different closeness to the subband edge.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUS may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHZ-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term “sub-6 GHz” or the like if used herein may broadly represent frequencies that may be less than 6 GHZ, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects (e.g., when the UE 104 is the transmitting device), the UE 104 may have a CB interleaving/deinterleaving component 198 that may be configured to generate a plurality of CBs. The plurality of CBs may be grouped into a plurality of CBGs. The CB interleaving/deinterleaving component 198 may be configured to interleave the plurality of CBs across the plurality of CBGs to construct a channel. The CB interleaving/deinterleaving component 198 may be configured to map the channel to one or more time-frequency resources associated with an allocation. The CB interleaving/deinterleaving component 198 may be configured to transmit, for a receiving device, the mapped channel using the one or more time-frequency resources. In certain aspects (e.g., when the base station 102 is the receiving device), the base station 102 may have a CB interleaving/deinterleaving component 199 that may be configured to receive a signal corresponding to a channel via one or more time-frequency resources associated with an allocation from a transmitting device. The CB interleaving/deinterleaving component 199 may be configured to recover a plurality of CBs from the channel. The CB interleaving/deinterleaving component 199 may be configured to deinterleave the plurality of CBs to recover a plurality of CBGs. The CB interleaving/deinterleaving component 199 may be configured to decode the deinterleaved plurality of CBs based on the recovered plurality of CBGs.

In certain aspects (e.g., when the UE 104 is the receiving device), the UE 104 may have a CB interleaving/deinterleaving component 198 that may be configured to receive a signal corresponding to a channel via one or more time-frequency resources associated with n allocation from a a transmitting device. The CB interleaving/deinterleaving component 198 may be configured to recover a plurality of CBs from the channel. The CB interleaving/deinterleaving component 198 may be configured to deinterleave the plurality of CBs to recover a plurality of CBGs. The CB interleaving/deinterleaving component 198 may be configured to decode the deinterleaved plurality of CBs based on the recovered plurality of CBGs. In certain aspects (e.g., when the base station 102 is the transmitting device), the base station 102 may have a CB interleaving/deinterleaving component 199 that may be configured to generate a plurality of CBs. The plurality of CBs may be grouped into a plurality of CBGs. The CB interleaving/deinterleaving component 199 may be configured to interleave the plurality of CBs across the plurality of CBGs to construct a channel. The CB interleaving/deinterleaving component 199 may be configured to map the channel to one or more time-frequency resources associated with an allocation. The CB interleaving/deinterleaving component 199 may be configured to transmit, for a receiving device, the mapped channel using the one or more time-frequency resources.

Therefore, according to various aspects, for an SBFD slot, the CBs across multiple CBGs may be interleaved before or while the CBs are mapped to the resources of an allocation.

Figures 2A, 2B, 2C, 2D:
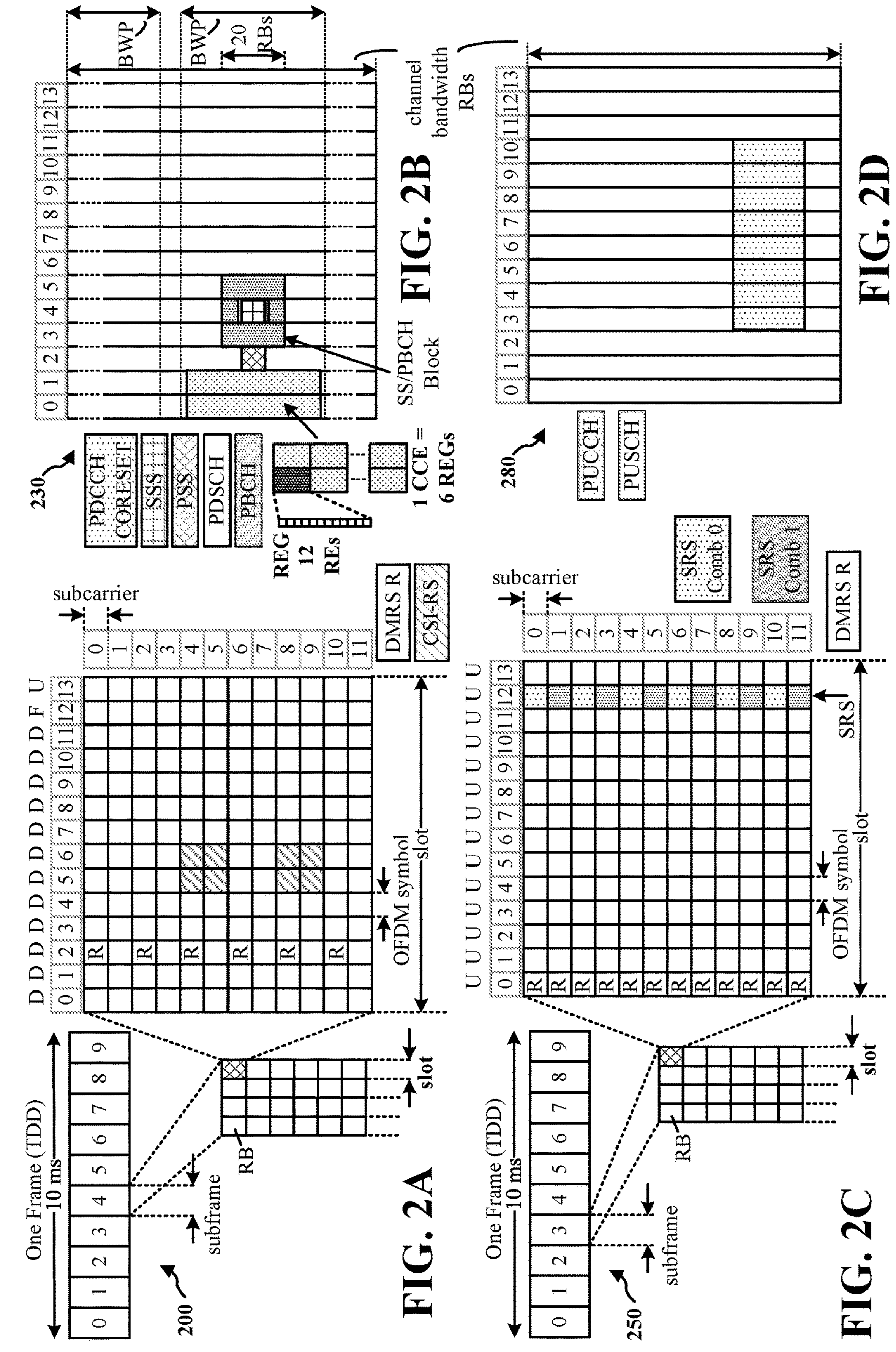
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
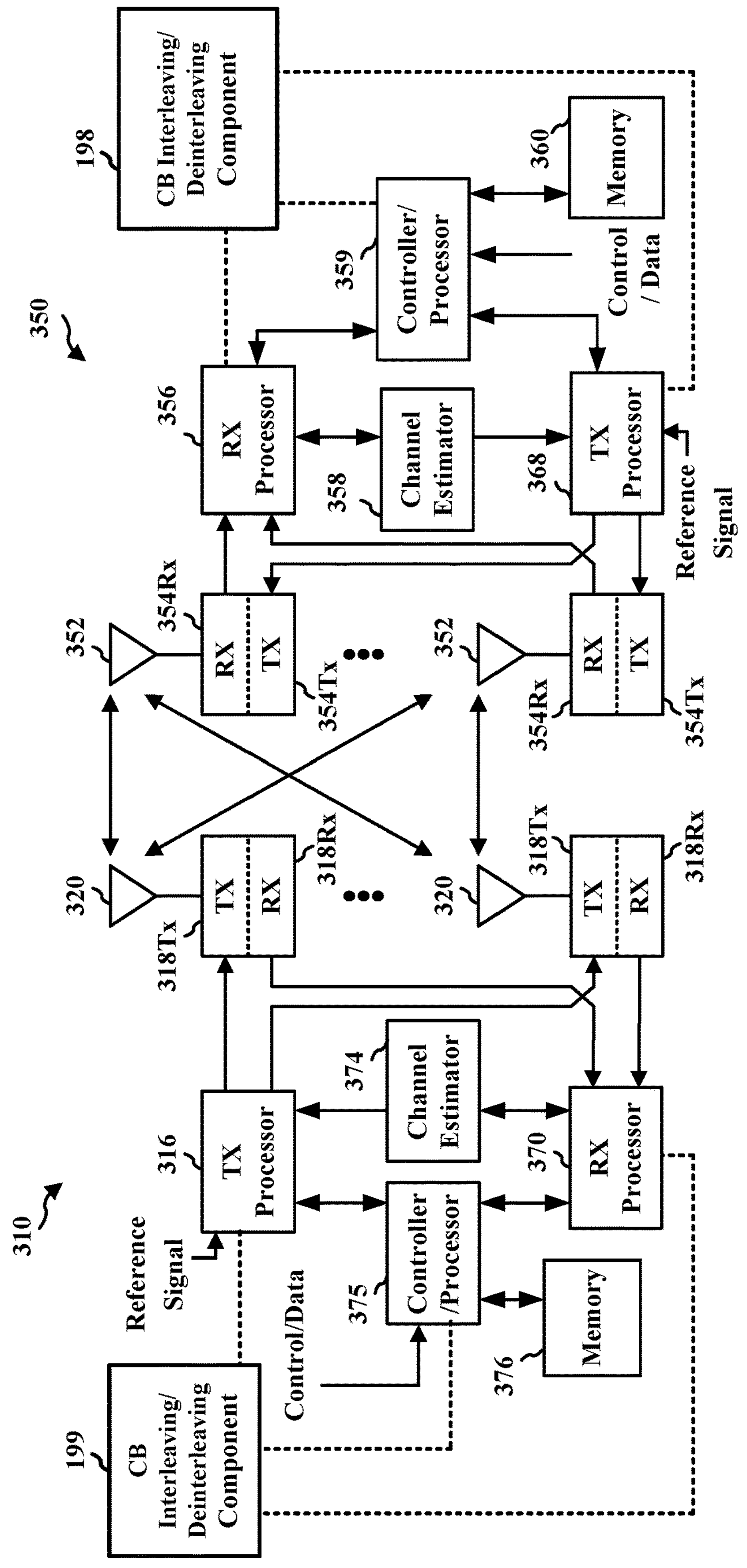
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the CB interleaving/deinterleaving component 198 of FIG. 1.

At least one of the TX processor 316, the RX processor 370, and the controller/processor 375 may be configured to perform aspects in connection with the CB interleaving/deinterleaving component 199 of FIG. 1.

Figure 4:
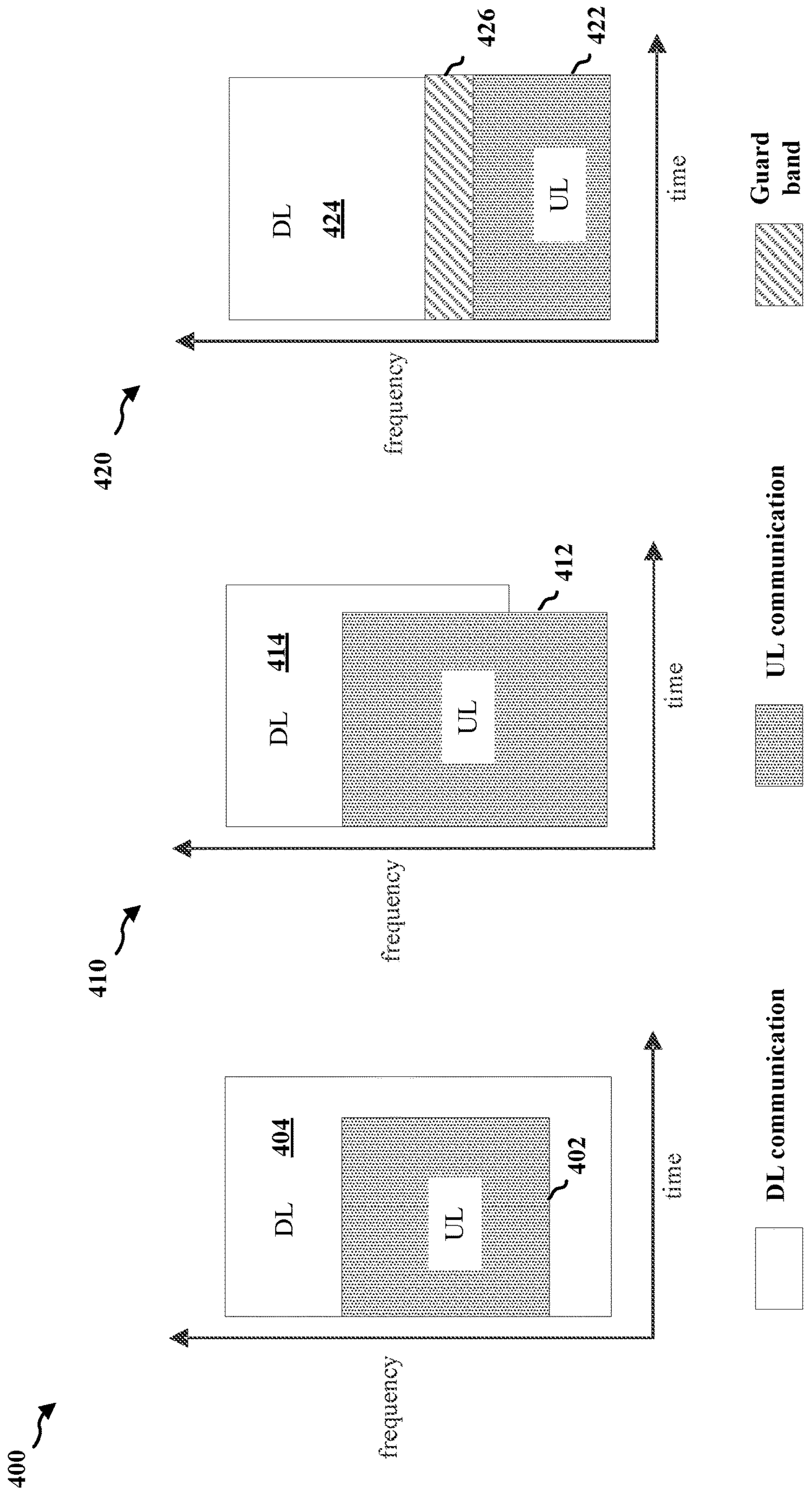
FIG. 4 illustrates a first example and a second example of in-band full-duplex (IBFD) resources and a third example of subband full-duplex (SBFD) resources.

FIG. 4 illustrates a first example 400 and a second example 410 of in-band full-duplex (IBFD) resources and a third example 420 of subband full-duplex (SBFD) resources. In IBFD, signals may be transmitted and received in overlapping times and overlapping in frequency. As shown in the first example 400, a time and a frequency allocation of a UL resources 402 may fully overlap with a time and a frequency allocation of DL resources 404. In the second example 410, a time and a frequency allocation of UL resources 412 may partially overlap with a time and a frequency of allocation of DL resources 414.

IBFD is in contrast to subband frequency division duplex (FDD), where uplink and downlink resources may overlap in time using different frequencies, as shown in the third example 420. In the third example 420, the UL resources 422 are separated from the DL resources 424 by a guard band 426. The guard band may be frequency resources, or a gap in frequency resources, provided between the UL resources 422 and the DL resources 424. Separating the UL frequency resources and the DL frequency resources with a guard band may help to reduce self-interference (SI). UL resources and DL resources that are immediately adjacent to each other correspond to a guard band width of 0. As an output signal, e.g., from a UE transmitter, may extend outside the UL resources, the guard band may reduce interference experienced by the UE. Subband FDD may also be referred to as "flexible duplex."

Figure 5:
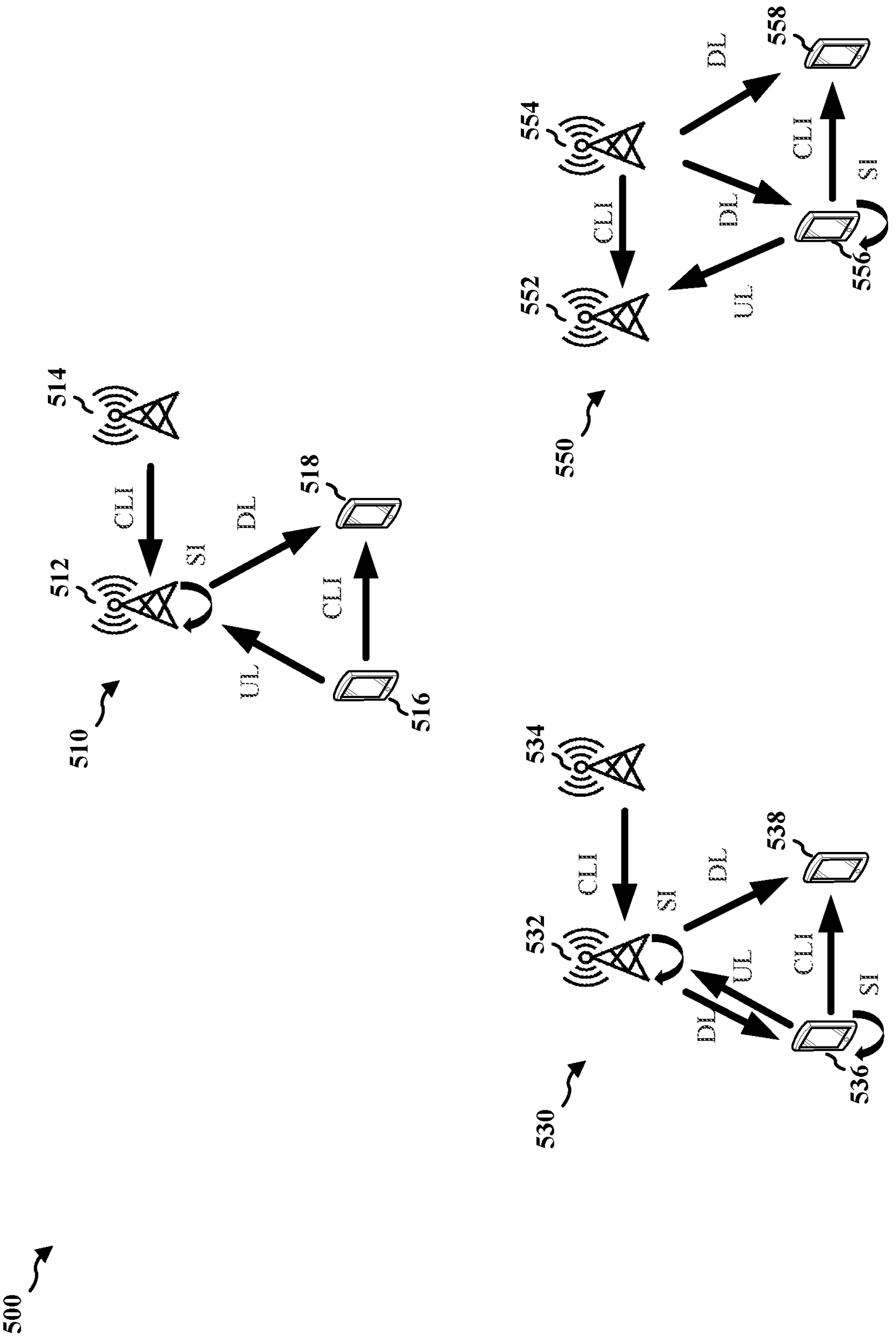
FIG. 5 is a diagram illustrating various example deployment scenarios including one or more full-duplex devices.

FIG. 5 is a diagram 500 illustrating various example deployment scenarios including one or more full-duplex devices. A full-duplex device (or a device working in a full-duplex mode) may transmit and receive at the same time. The diagram 510 illustrates an example deployment scenario including at least one full-duplex network node and two half-duplex UEs. Operating in the full-duplex mode, a first network node 512 may transmit to a second UE 518 and receive from a first UE 516 at the same time. The full-duplex operation may create SI at the first network node 512. In particular, at the first network node 512, the downlink transmission to the second UE 518 may cause interference to the uplink reception from the first UE 516. Further, the uplink transmission by the first UE 516 to the first network node 512 may cause cross-link interference (CLI) to the downlink reception by the second UE 518 from the first network node 512. Moreover, a transmission from a second network node 514 may cause CLI to the uplink reception at the first network node 512.

The diagram 530 illustrates an example deployment scenario including at least one full-duplex network node and at least one full-duplex UE/customer premises equipment (CPE). A first network node 532 may communicate with a first UE/CPE 536 in the full-duplex mode. In other words, uplink and downlink transmissions may take place at the same time between the first network node 532 and the first UE/CPE 536. At the same time, the first network node 532 may transmit to a second UE/CPE 538. The downlink transmissions to both the first UE/CPE 536 and the second UE/CPE 538 may cause SI to the uplink reception from the first UE/CPE 536 at the first network node 532. Further, the uplink transmission from the first UE/CPE 536 may cause SI to the downlink reception at the first UE/CPE 536, and may cause CLI to the downlink reception at the second UE/CPE 538. Moreover, a transmission from a second network node 534 may cause CLI to the uplink reception at the first network node 532.

The diagram 550 illustrates an example deployment scenario including two half-duplex network nodes (or two transmit receive points (TRPs)) and at least one full-duplex UE/CPE. A first UE/CPE 556 may work in the full-duplex mode. In particular, the first UE/CPE 556 may transmit to a first network node 552 and receive from a second network node 554 at the same time. Accordingly, the uplink transmission from the first UE/CPE 556 to the first network node 552 may cause SI to the downlink reception at the first UE/CPE 556. Further, the second network node 554 may transmit to a second UE/CPE 558 at the same time the second network node 554 transmits to the first UE/CPE 556. The downlink transmissions from the second network node 554 to both the first UE/CPE 556 and the second UE/CPE 558 may cause CLI to the uplink reception at the first network node 552. Further, the uplink transmission from the first UE/CPE 556 to the first network node 552 may cause CLI to the downlink reception at the second UE/CPE 558.

Figure 6:
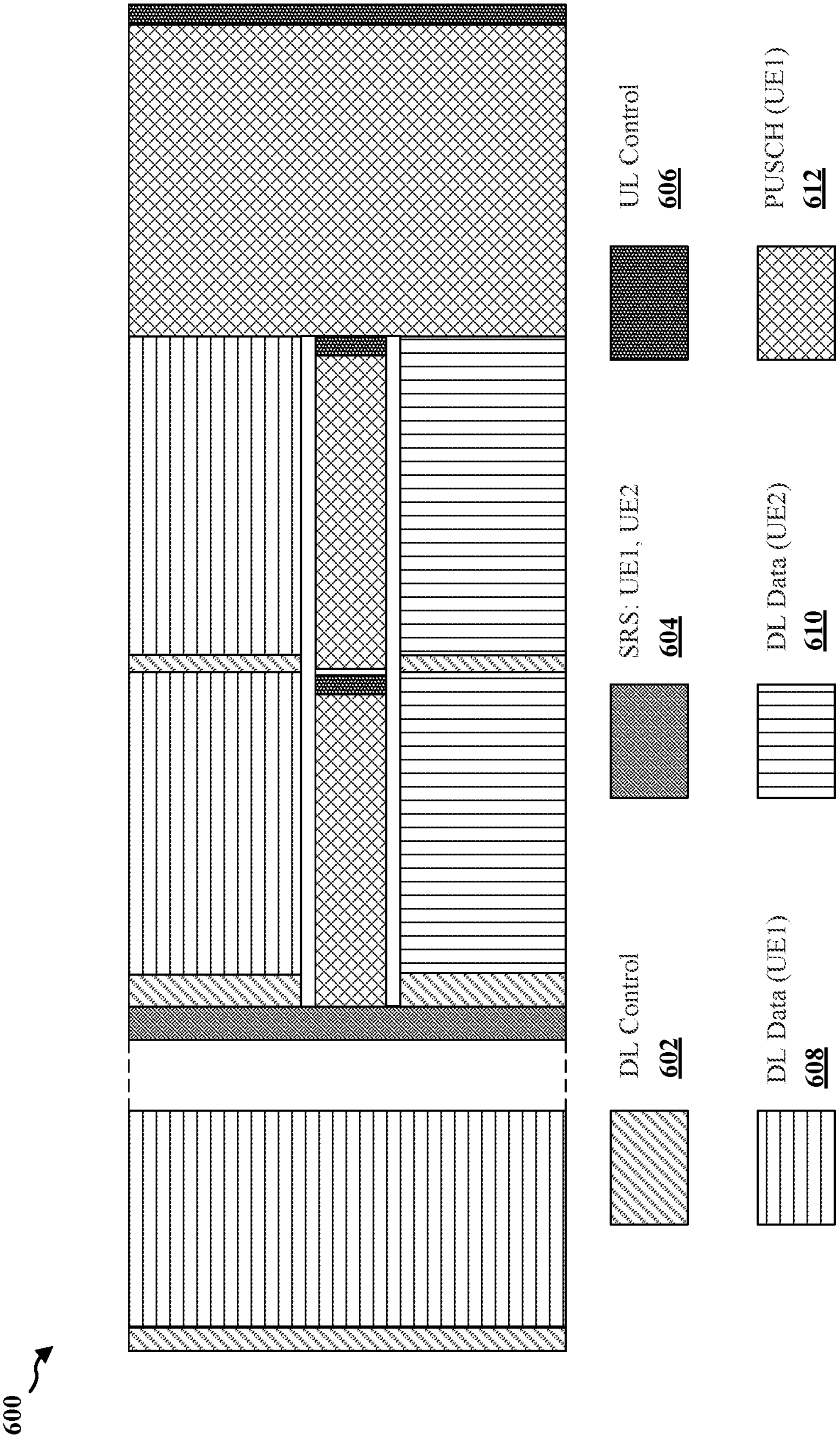
FIG. 6 is a diagram illustrating an example slot format of an example SBFD slot.

FIG. 6 is a diagram illustrating an example slot format of an example SBFD slot 600. The SBFD slot 600 may be a "DL+UL" ("D+U") slot where the band may be used for both UL and DL transmissions. As shown, the SBFD slot 600 may accommodate one or more DL control channels 602, SRS resources 604 (e.g., for a first UE (UE1) and a second UE (UE2)), one or more UL control channels 606, one or more DL data channels 608 for UE1, one or more DL data channels 610 for UE2, and/or a PUSCH 612 for UE1. A "D+U" slot (e.g., the SBFD slot 600) may include DL symbols where UL transmissions are not permitted, UL symbols where DL transmissions are not permitted, or full-duplex (e.g., "D+U") symbols. Further, the DL and UL transmissions may occur in overlapping bands (e.g., IBFD) or in adjacent bands (e.g., SBFD). In particular, in a given "D+U" symbol in the "D+U" slot, a half-duplex UE may either transmit in the UL band or receive in the DL band, whereas a full-duplex UE may transmit in the UL band and/or receive in the DL band in the same slot.

Frequency domain resource allocation (FDRA) allocation type 0 and allocation type 1 may be two ways of representing resource allocations in the frequency domain. Allocation type 0 may use a bitmap representation of resource block groups (RBGs), while allocation type 1 may use a more compact resource indicator value (RIV) field. In particular, allocation type 0 may be based on a bitmap of RBGs. In this type, the allocation may be represented as a bitmap where each bit may correspond to an RBG. An RBG may be a group of contiguous RBs. The size of an RBG may depend on the BWP size (e.g., the number of RBs in a BWP) and the configuration type (i.e., configuration 1 or configuration 2). The length of the bitmap may be, for example, 18 bits or 9 bits. A "1" in the bitmap may indicate that the corresponding RBG is allocated, while a "0" may represent that the RBG is not allocated. The allocation may be used for a disjoint RB allocation. On the other hand, allocation type 1 may use a more compact representation called an RIV field to allocate resources. The RIV may be a single value that combines information about the starting RB and the length of the contiguous allocation. This allocation type may be useful for situations where the allocation is sparse or the number of allocated RBs is small compared to the BWP size. The RIV field may be calculated using the following formulas: $RIV=N*(K-1)+S$ (if $K-1<=\text{floor}(N/2)$), or $RIV=N*(N-K+1)+(N-1-S)$ (else), where N is the BWP size, K is the length of the contiguous allocation (number of consecutive RBs), and S is the starting RB index (the first RB of the contiguous allocation).

SBFD slots may have two disjoint DL allocations or two disjoint UL allocations. The two disjoint DL/UL (sub)bands may be separated by a UL/DL (sub)band (e.g., a large UL/DL (sub)band) (e.g., two disjoint DL (sub)bands may be separated by a UL (sub)band, or two disjoint UL (sub)bands may be separated by a DL (sub)band) in addition to any guard bands. A transmission of a DL signal/channel (e.g., by a base station) on the (sub)band edge that is close to the UL (sub)band may suffer from interference (e.g., CLI and/or self-interference). Similarly, a transmission of a UL signal/channel (e.g., by a UE) on the (sub)band edge that is close to the DL (sub)band may also suffer from interference. Accordingly, the RBs closer to the subband edge may be associated with lower (less) channel quality. In general, channel mapping for the PDSCH or the PUSCH may occur in frequency first then in time (i.e., the mapping process may map, sequentially, for a same symbol, modulation symbols to RBs in the order of lower frequency RBs to higher frequency RBs, before the mapping process continues onto the next symbol). In some cases, some CBGs may be mapped closer to the subband edge than other CBGs. Such uneven mapping of the CBGs may lead to higher chances of error in some CBGs (i.e., in CBGs closer to the subband edge).

To mitigate the effects of uneven mapping of CBGs in an SBFD operation, interleaving may be a solution. However, type 0 resource allocation may not support interleaving. Further, interleaving may not be available sometimes even for type 1 resource allocation.

One or more aspects of the disclosure may relate to CB index interleaving that may ensure that the CBs that belong to the same CBG may be spread across the band allocation (e.g., across the entire bandwidth of the allocation). As a result, a similar error rate may be achieved for all CBGs included in the SBFD operation.

In some configurations, after encoding and CBG grouping, the transmitting device may interleave the CBs across the CBGs to construct the final channel (e.g., a PDSCH or a PUSCH), where the final channel may then be mapped to the time-frequency resources (e.g., in frequency first then in time). In different configurations, the interleaving may be performed at different granularities. In one example configuration, the interleaving may be performed on the granularity/level of a fraction of a CB (i.e., a sub-CB granularity) (e.g., a half of a CB, a quarter of a CB, etc.). In another example configuration, the interleaving may be performed on the granularity/level of a CB (i.e., a CB granularity). In yet another example configuration, the interleaving may be performed on the granularity/level of a set of CBs (i.e., a multiple of CBs, a multiple-CB granularity).

Figure 7:
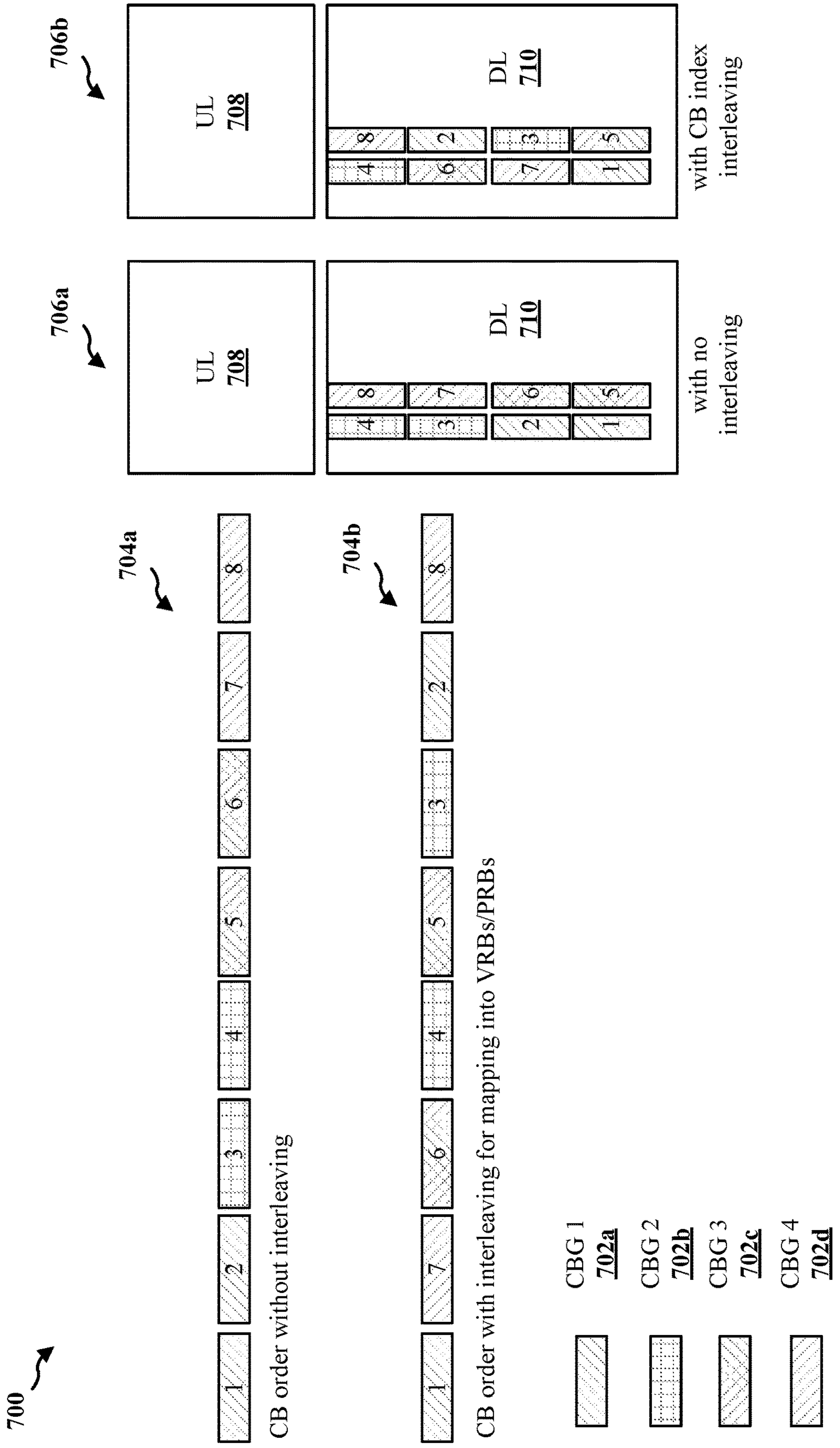
FIG. 7 is a diagram illustrating example CB interleaving for an SBFD operation according to one or more aspects.

FIG. 7 is a diagram 700 illustrating example CB interleaving for an SBFD operation according to one or more aspects. As shown, an SBFD slot may include a UL subband 708 and a DL subband 710. 8 CBs including CB1 through CB8 may be scheduled to be transmitted by a base station/network node via the DL subband 710, where CB1 and CB2 may be grouped into the first CBG (CBG 1) 702*a*, CB3 and CB4 may be grouped into the second CBG (CBG 2) 702*b*, CB5 and CB6 may be grouped into the third CBG (CBG 3) 702*c*, and CB7 and CB8 may be grouped into the fourth CBG (CBG 4) 702*d*. The diagrams 704*a* shows the order of the 8 CBs without CB interleaving. Without interleaving, the 8 CBs may be mapped, in the order shown in the diagram 704*a*, to the time-frequency resources in the DL subband 710 (e.g., in frequency first and then in time) (e.g., based on an allocation). The diagram 706*a* shows the result of the mapping without CB interleaving. As shown in the diagram 706*a*, some CBGs (e.g., CBG 2 702*b* including CB3 and CB4, and CBG 4 702*d* including CB7 and CB8) may be mapped to the resources closer to the subband edge of the DL subband 710 that is near the UL subband 708 than other CBGs (e.g., CBG1 702*a* including CB1 and CB2, and CBG 3 702*c* including CB5 and CB6). Because the resources closer to the subband edge of the DL subband 710 that is near the UL subband 708 may be associated with a lower channel quality, as explained above, the CBGs may suffer from uneven error rates. For example, the CBG 2 702*b* and the CBG 4 702*d*, being closer to the subband edge, may suffer from a higher error rate than the CBG 1 702*a* and the CBG 3 702*c*.

The diagram 704*b* shows the order of the 8 CBs after CB interleaving. CB interleaving (also referred to as CB index interleaving) may refer to adjusting the order of the CBs such that CBs belonging to different CBGs may be interleaved in the CB order for mapping the CBs to the resources (e.g., mapping into virtual RBs (VRBs) or PRBs). Further, the diagram 706*b* shows the result of the mapping where CB interleaving is used. As shown in the diagram 706*b*, the when the CB interleaving is used, the CBs belonging to each CBG may be more evenly mapped to the DL subband 710 in terms of the closeness of the resources to the subband edge that is near the UL subband 708. Accordingly, although some CBs may be mapped to resources closer to the subband edge than other CBs, CBGs, each of which may include multiple CBs, overall, may be mapped to the resources in the DL subband 710 in an even manner in terms of the closeness of the resources to the subband edge that is near the UL subband 708. In other words, no CBG may be mapped to resources significantly closer to the subband edge than another CBG. As a result, the CBGs may not suffer from uneven error rates that may be caused by the resources having different closeness to the subband edge. Although FIG. 7 shows the CB interleaving at the granularity of individual CBs, in different configurations, the CB interleaving may be performed at other granularities (e.g., a fraction of a CB or a set of CBs, etc.).

In some configurations, the manner in which CB interleaving is performed may be predetermined (e.g., fixed). For example, the CB interleaving may be performed based on a (table writing) row-column interleaver (e.g., a row-column interleaver may be associated with a depth N). A row-column interleaver may work by writing the input data into a matrix row-wise and then reading it out column-wise. The process may also be reversed by writing the data column-wise and reading it out row-wise. For example, to interleave an input data sequence of 9 bits (e.g., input data: [a1, a2, a3, a4, a5, a6, a7, a8, a9]), a 3×3 matrix (i.e., depth=3) may be used. The row-column interleaver may write the data into the matrix row-wise:

| | | |
|---|---|---|
| a1 | a2 | a3 |
| a4 | a5 | a6 |
| a7 | a8 | a9 |

Then, the row-column interleaver may read the data out column-wise to obtain the interleaved data sequence (e.g., interleaved data: [a1, a4, a7, a2, a5, a8, a3, a6, a9]. A deinterleaving process may be performed at the receiver side to recover the original data sequence. The deinterleaving may include writing the received data into the matrix column-wise and reading the data out row-wise, effectively reversing the interleaving process.

In another example, the CB interleaving may be performed based on a configured interleaving type (e.g., based on a preconfigured interleaving pattern).

Figure 8:
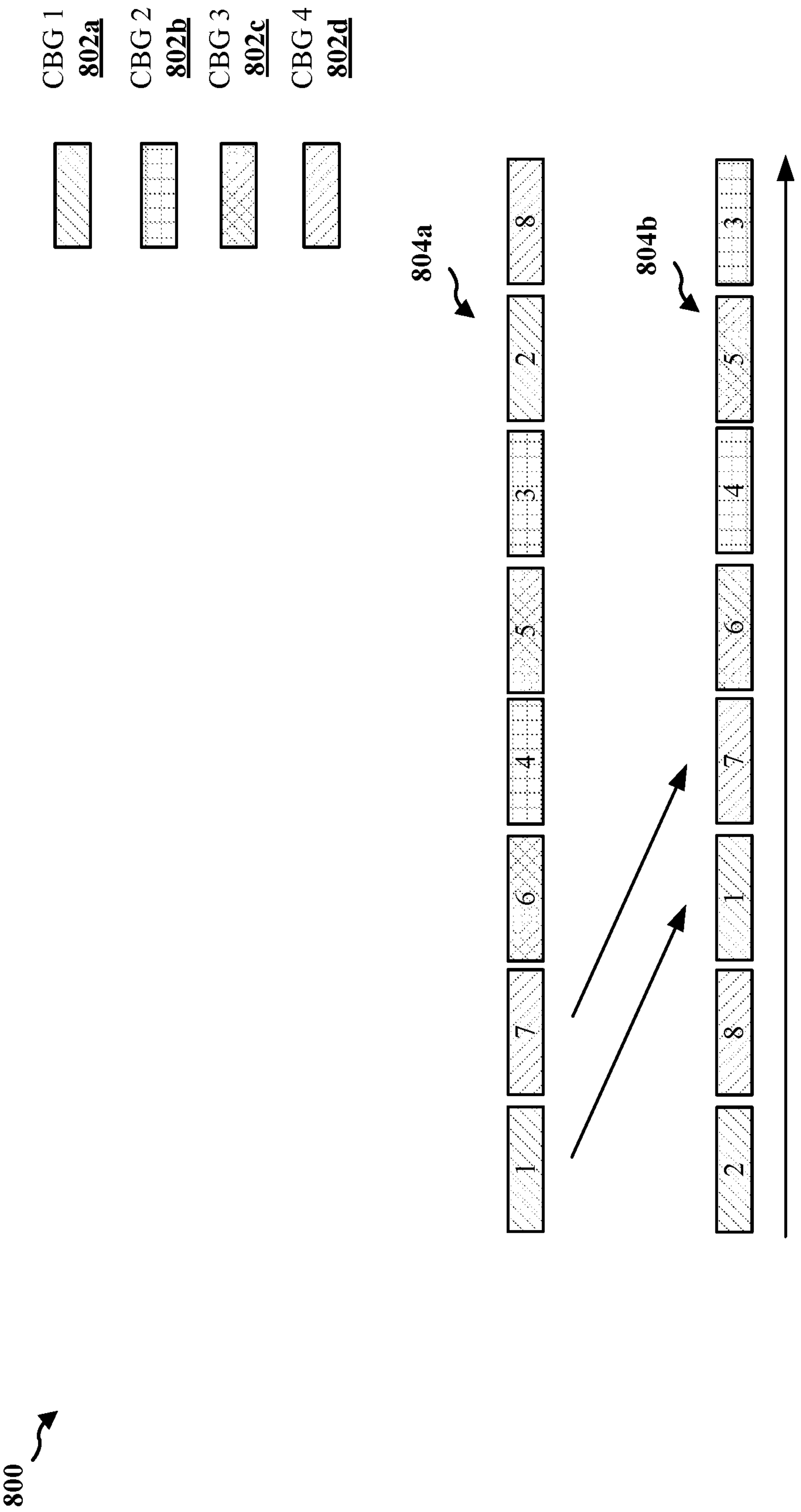
FIG. 8 is a diagram illustrating example cyclic shifting of interleaved CBs according to one or more aspects.

FIG. 8 is a diagram 800 illustrating example cyclic shifting of interleaved CBs according to one or more aspects. In some configurations, after the CB interleaving, the transmitting device may cyclically shift the interleaved CBs (e.g., based on a cyclic shift parameter, such as a ShiftIndex parameter) before mapping the CBs to the resources. The possibility of cyclically shifting the interleaved CBs may provide further flexibility (e.g., more degrees of freedom) to the interleaving process. FIG. 8 shows a rightward cyclic shift by 2 CBs of the interleaved CBs as shown in the diagram 704*b* in FIG. 7. The 8 CBs (CB1 through CB8) may be grouped into the 4 CBGs (CBG 1 802*a*, CBG 2 802*b*, CBG 3 802*c*, and CBG 4 802*d*) in a way similar to the grouping of CBs into CBGs as shown in FIG. 7. Further, the diagram 804*a*, showing the interleaved CBs, may correspond to the diagram 704*b* in FIG. 7. The diagram 804*b* shows the order of the CBs after the cyclic shift is completed. In particular, CB1, CB7, CB6, CB4, CB5, and CB3 may be shifted rightward by 2 CBs, and CB2 and CB8 may be wrapped around (i.e., cyclically shifted) to be placed at the beginning of the CBs. In different configurations, the shift unit for the cyclic shift may be a single CB or a group of CBs (e.g., the shift unit for the cyclic shift shown in FIG. 8 may be 2 CBs). Further, in some configurations, the cyclic shift including the shift unit may be predetermined (fixed) (e.g., based on an RRC parameter). In some other configurations, the cyclic shift including the shift unit may be determined and computed based on one or more parameters. For example, such parameters may include the slot index, the bandwidth of the (subband) allocations, the number of CBS, the number of CBGs, etc.

In some configurations, the granularity of the CB interleaving may be a fraction of a CB (e.g., a half of a CB, a third of a CB, a quarter of a CB, etc.). In some configurations, if the number of modulation symbols in a CB is not divisible by a divisor that may correspond to a given fraction-of-CB granularity, a floor operation (or any other suitable round function) may be used to determine the number of modulation symbols in each CB segment to be subjected to the interleaving (i.e., in each interleaving unit). For example, if a CB includes 15 modulation symbols and the granularity to be used for the interleaving is a half of a CB (i.e., the divisor is 2), because 15 modulation symbols are not divisible by 2, a floor operation may be used to determine the number of modulation symbols in each interleaving unit. In this example, based on the floor operation, the number of modulation symbols in each interleaving unit may be 7 modulation symbols (i.e., floor (15/2)).

In some configurations, the granularity of the CB interleaving may be a set of CBs (i.e., a group of consecutive CBs/an integer number of consecutive CBs). For example, 2 consecutive CBs may constitute a block for interleaving (i.e., the interleaving unit may be 2 CBs).

In some configurations, the transmitting device may achieve CB interleaving by selecting a CBG from the CBGs based on an order, sequentially and one at a time, when the CBs are being mapped to the resources, where upon each selection, just a portion of the selected CBG (i.e., a next portion of a CB, a next CB, or next multiple CBs from the selected CBG, but not the entire CBG at once) may be mapped to the resources. The CBG selection order may be continuous, that is, there may be multiple rounds of CBG selection based on the order, where in each round some of the remaining unmapped CBs in the selected CBG (or all the remaining unmapped CBs in the selected CBG in case of the last round for the CBG) may be mapped to the resources. The CBGs may be selected and the CBs mapped to the resources based on the continuous order until all the CBs have been mapped to the resources. Viewed differently, the CBGs may be considered as having been moved around in a predefined manner when the CBs are being mapped to the resources, where some of the CBs from the CBG first in order may be mapped to the resources before the CBGs are moved again. Accordingly, the CB interleaving and the mapping of the CBs to the resources may be viewed as being performed concurrently. Hereinafter the concurrently performed CB interleaving and mapping of CBs to the resources may be referred to as enhanced resource mapping.

Figure 9:
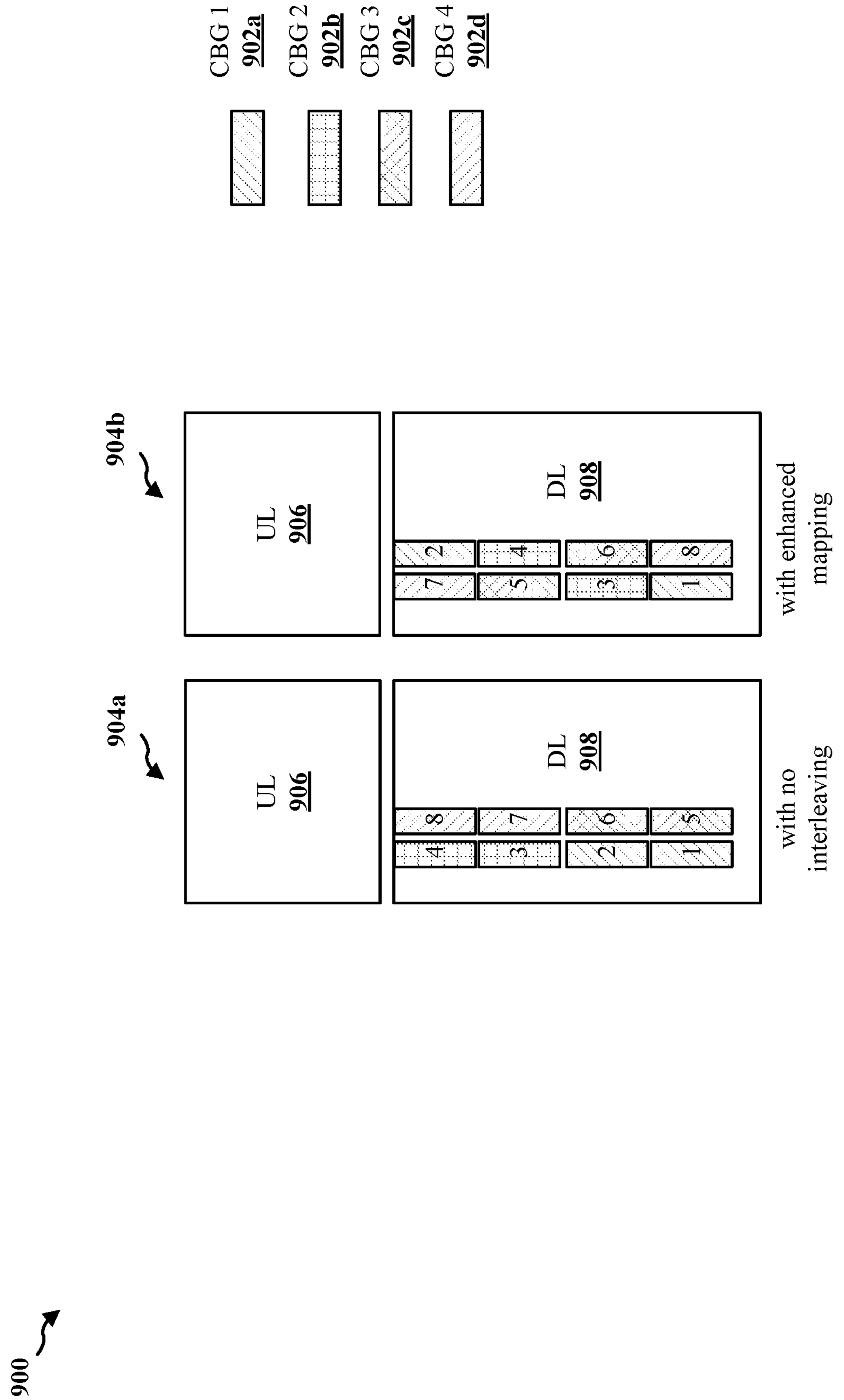
FIG. 9 is a diagram illustrating example enhanced resource mapping according to one or more aspects.

FIG. 9 is a diagram 900 illustrating example enhanced resource mapping according to one or more aspects. 8 CBs, CB1 through CB8, may be scheduled to be mapped to the resources in the DL subband 908 (e.g., for a PDSCH allocation), where the DL subband 908 may share an SBFD slot with a UL subband 906. The 8 CBs may be similar to the 8 CBs shown in FIG. 7, and may be similarly grouped into 4 CBGs including CBG 1 902*a*, CBG 2 902*b*, CBG 3 902*c*, and CBG 4 902*d*. The diagram 904*a* shows the result of the mapping of the 8 CBs to the resources in the DL subband 908 where no CB interleaving is performed. Accordingly, the diagram 904*a* may be similar to the diagram 706*a* in FIG. 7. The diagram 904*b* shows the result of the mapping of the 8 CBs to the resources in the DL subband 908 with the enhanced resource mapping (i.e., the CB interleaving and the mapping of the CBs to the resources may be performed concurrently, as described above). The diagram 904*b* may be similar to the diagram 706*b* in FIG. 7. Accordingly, the 4 CBGs may be evenly mapped to the DL subband 908 in terms of the closeness of the resources to the edge of the DL subband that is near the UL subband 906. Therefore, the CBGs may not suffer from uneven error rates. As the CBs are mapped to the resources in frequency first and then in time, the diagram 904*b* shows the CBG selection order used for the enhanced resource mapping may be CBG 1 902*a* (mapping CB1)-CBG 2 902*b* (mapping CB3)-CBG 3 902*c* (mapping CB5)-CBG 4 902*d* (mapping CB7)-CBG 4 902*d* (mapping CB8)-CBG 3 902*c* (mapping CB6)-CBG 2 902*b* (mapping CB4)-CBG 1 902*a* (mapping CB2). This CBG selection order may be referred to as a forward (from CBG 1 902*a* to CBG 4 902*d*)-inverse (from CBG 4 902*d* to CBG 1 902) order. Stated differently, the enhanced resource mapping may be performed in a forward-inverse manner. By analogy, in some other configurations, the enhanced resource mapping may be performed in a forward-forward manner or an inverse-inverse manner. In still other configurations, the enhanced resource mapping may be performed in any preconfigured manner (i.e., the CBG selection order may be any suitable preconfigured order).

In different configurations, the number of CBs from a CBG to be mapped to the resources upon each selection of the CBG during the enhanced resource mapping (i.e., the granularity for the CB interleaving) may be one (i.e., a CB granularity) or greater than one (i.e., a multiple-CB granularity). In different configurations, the number of CBs from a CBG to be mapped to the resources upon each selection of the CBG during the enhanced resource mapping (i.e., the granularity for the CB interleaving) may be predetermined (fixed), RRC configured, or dynamically indicated (e.g., via a DCI message).

In some configurations, the CB interleaving may be enabled or disabled based on one or more factors. In one configuration, the CB interleaving may be enabled or disabled based on an RRC configured parameter. In another configuration, the CB interleaving may be enabled or disabled based on a dynamic indication (e.g., via a scheduling DCI message). In yet another configuration, the CB interleaving may be enabled or disabled based on the slot type. For example, the CB interleaving may be enabled for some slot types and may be disabled for some other slot types. For example, the CB interleaving may be enabled for SBFD slots (e.g., DL-UL-DL slots). In yet another configuration, the CB interleaving may be enabled or disabled based on the band allocation (i.e., the allocation of resources in a subband for a channel). For example, if the allocation is at least a threshold number of RBs (e.g., 50 RBs) away from the subband edge that is near another subband of a different type, the CB interleaving/enhanced resource mapping may be disabled because the allocation is less likely to suffer from uneven channel qualities. Otherwise (i.e., the allocation is not at least the threshold number of RBs away from the subband edge the CB interleaving/enhanced resource mapping may be enabled. In yet another configuration, the CB interleaving may be enabled or disabled based on the bandwidth of the allocation. For example, the unevenness of the channel qualities may be negligible if the bandwidth of the allocation is limited, and as a result, the CB interleaving may not be needed. In some configurations, the CB interleaving may be enabled or disabled based on any suitable combination of the above-described factors.

Figure 10:
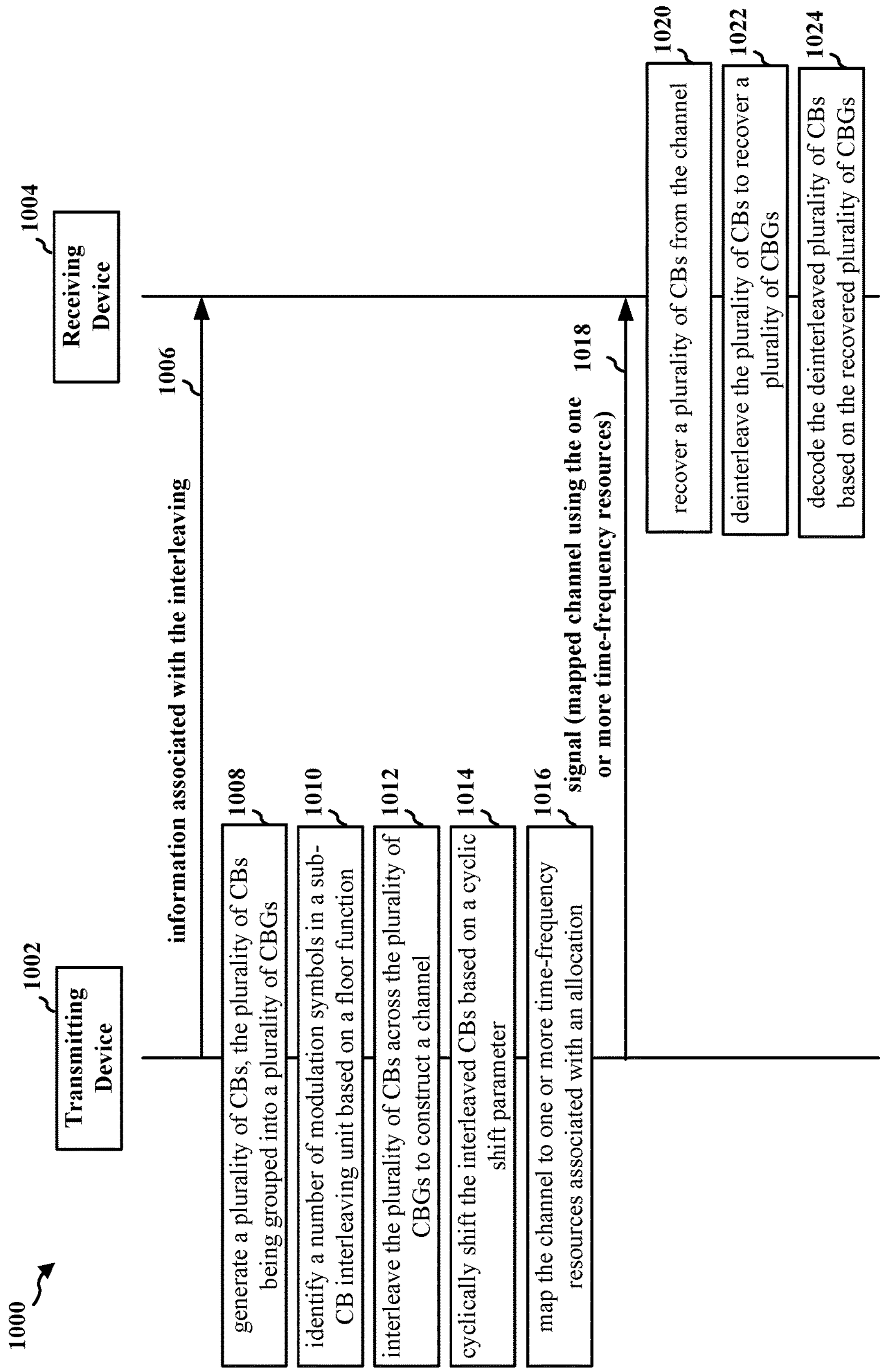
FIG. 10 is a diagram of a communication flow of a method of wireless communication.

FIG. 10 is a diagram of a communication flow 1000 of a method of wireless communication. In some configurations, for an uplink transmission, the transmitting device 1002 may correspond to the UE 104/350, and the receiving device 1004 may correspond to the base station/network node 102/310. In some other configurations, for a downlink transmission, the transmitting device may correspond to the base station/network node 102/310, and the receiving device 1004 may correspond to the UE 104/350. In one configuration, at 1006, the transmitting device 1002 may transmit, for the receiving device 1004, information associated with interleaving. The interleaving may be performed at 1012, as will be described below.

At 1008, the transmitting device 1002 may generate a plurality of CBs. The plurality of CBs may be grouped into a plurality of CBGs.

At 1012, the transmitting device 1002 may interleave the plurality of CBs across the plurality of CBGs to construct a channel.

In one configuration, the plurality of CBs may be interleaved by the transmitting device 1002, at 1012, based on one of a sub-CB granularity, a single-CB granularity, or a multiple-CB granularity.

In one configuration, the plurality of CBs may be interleaved, at 1012, based on the sub-CB granularity. At 1010, the transmitting device 1002 may identify a number of modulation symbols in a sub-CB interleaving unit based on a floor function if a quantity of modulation symbols in a CB is not divisible by a divisor.

In one configuration, the interleaving by the transmitting device 1002, at 1012, may be based on a preconfigured interleaver.

In one configuration, the preconfigured interleaver may include a row-column interleaver.

In one configuration, at 1014, the transmitting device 1002 may cyclically shift the interleaved CBs based on a cyclic shift parameter. A shift unit associated with the cyclic shift may correspond to a single CB or a set of CBs.

In one configuration, the shift unit may be predetermined or based on at least one of a slot index, a bandwidth of the allocation, a number of CBs, or a number of CBGs.

In one configuration, the interleaving by the transmitting device 1002, at 1012, may be enabled or disabled based on one or more of an RRC configured parameter, a dynamic indication in a DCI message, a slot type, the allocation, or a bandwidth of the allocation.

In one configuration, the channel may be a PDSCH or a PUSCH.

At 1016, the transmitting device 1002 may map the channel to one or more time-frequency resources associated with an allocation.

In one configuration, the allocation may be associated with an SBFD operation.

In one configuration, the transmitting device 1002 may interleave the plurality of CBs, at 1012, and map the channel, at 1016, concurrently based on sequentially selecting a CBG in the plurality of CBGs for the mapping of the channel in a predetermined order. One of a next fraction of a CB, a next CB, or a next set of CBs in the selected CBG may be mapped to the one or more time-frequency resources.

In one configuration, the selecting of the CBG and the mapping of the channel may be based on a preconfigured manner.

In one configuration, the preconfigured manner may be one of a forward-inverse manner, a forward-forward manner, or an inverse-inverse manner.

At 1018, the transmitting device 1002 may transmit, for a receiving device 1004, the mapped channel using the one or more time-frequency resources. In other words, the receiving device 1004 may receive a signal corresponding to a channel via one or more time-frequency resources associated with an allocation from a transmitting device 1002.

At 1020, the receiving device 1004 may recover a plurality of CBs from the channel.

At 1022, the receiving device 1004 may deinterleave the plurality of CBs to recover a plurality of CBGs.

In one configuration, the plurality of CBs may be deinterleaved by the receiving device 1004, at 1022, based on information associated with interleaving (e.g., as received at 1006).

In one configuration, the plurality of CBs may be deinterleaved by the receiving device 1004, at 1022, based on one of a sub-CB granularity, a single-CB granularity, or a multiple-CB granularity. The granularity of deinterleaving at 1022 may be consistent with the granularity of interleaving at 1012.

In one configuration, the deinterleaving by the receiving device 1004, at 1022, may be enabled or disabled based on one or more of an RRC configured parameter, a dynamic indication in a DCI message, a slot type, the allocation, or a bandwidth of the allocation.

At 1024, the receiving device 1004 may decode the deinterleaved plurality of CBs based on the recovered plurality of CBGs.

Figure 11:
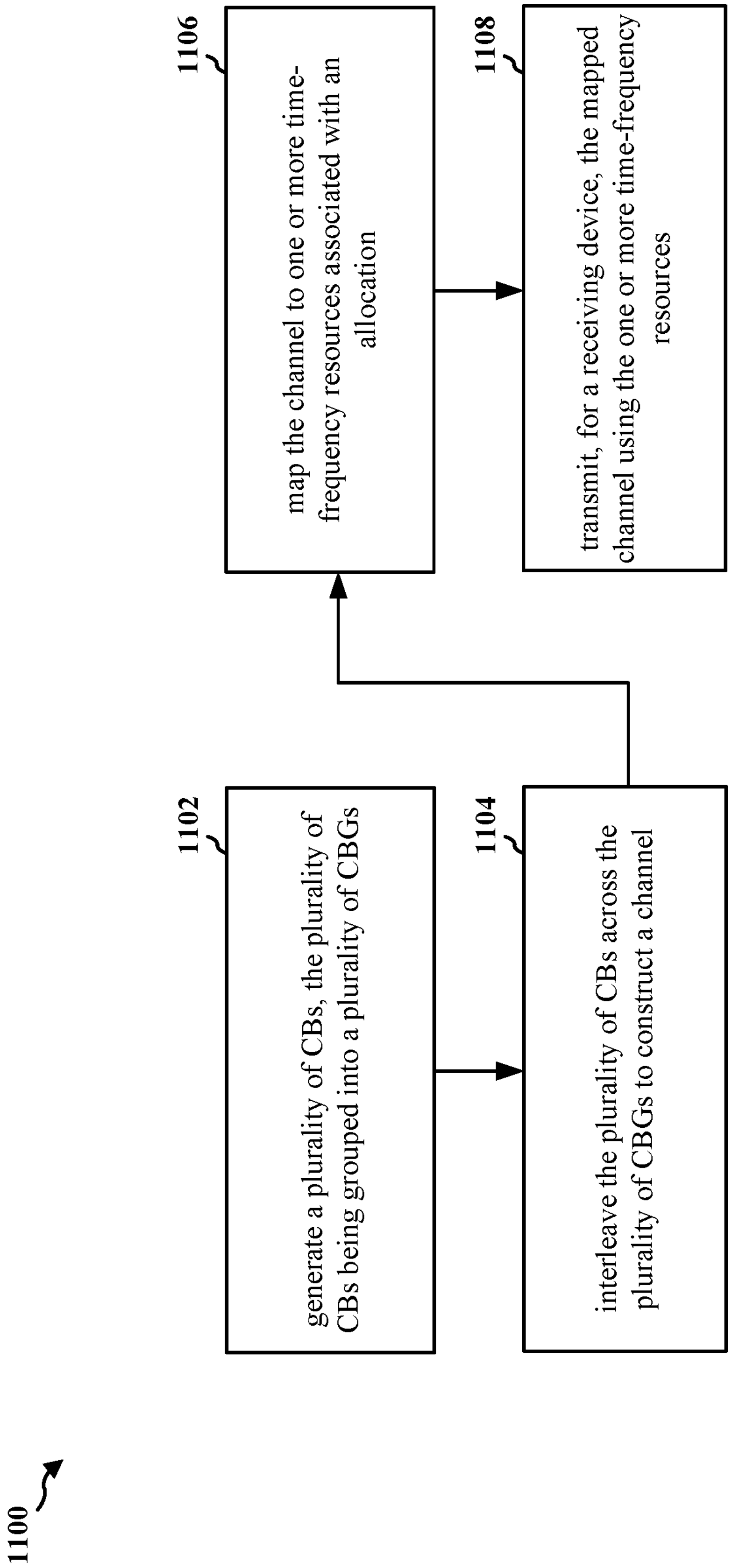
FIG. 11 is a flowchart of a method of wireless communication.

FIG. 11 is a flowchart 1100 of a method of wireless communication. The method may be performed by a transmitting device (e.g., the transmitting device 1002; the UE 104/350; the apparatus 1504; the base station 102/310; the network entity 1502/1602). At 1102, the transmitting device may generate a plurality of CBs. The plurality of CBs may be grouped into a plurality of CBGs. For example, 1102 may be performed by the component 198 in FIG. 15 or the component 199 in FIG. 16. Referring to FIG. 10, at 1008, the transmitting device 1002 may generate a plurality of CBs. For example, the diagram 704*a* in FIG. 7 illustrates a plurality of CBs generated by a transmitting device.

At 1104, the transmitting device may interleave the plurality of CBs across the plurality of CBGs to construct a channel. For example, 1104 may be performed by the component 198 in FIG. 15 or the component 199 in FIG. 16. Referring to FIG. 10, at 1012, the transmitting device 1002 may interleave the plurality of CBs across the plurality of CBGs to construct a channel. For example, the diagram 704*b* in FIG. 7 illustrates the plurality of CBs that have been interleaved across the plurality of CBGs by the transmitting device to construct a channel.

At 1106, the transmitting device may map the channel to one or more time-frequency resources associated with an allocation. For example, 1106 may be performed by the component 198 in FIG. 15 or the component 199 in FIG. 16. Referring to FIG. 10, at 1016, the transmitting device 1002 may map the channel to one or more time-frequency resources associated with an allocation. For example, the diagram 706*b* in FIG. 7 illustrates the channel including the interleaved plurality of CBs that has been mapped by the transmitting device to one or more ime-frequency resources associated with a DL allocation.

At 1108, the transmitting device may transmit, for a receiving device, the mapped channel using the one or more time-frequency resources. For example, 1108 may be performed by the component 198 in FIG. 15 or the component 199 in FIG. 16. Referring to FIG. 10, at 1018, the transmitting device 1002 may transmit, for a receiving device 1004, the mapped channel using the one or more time-frequency resources.

Figure 12:
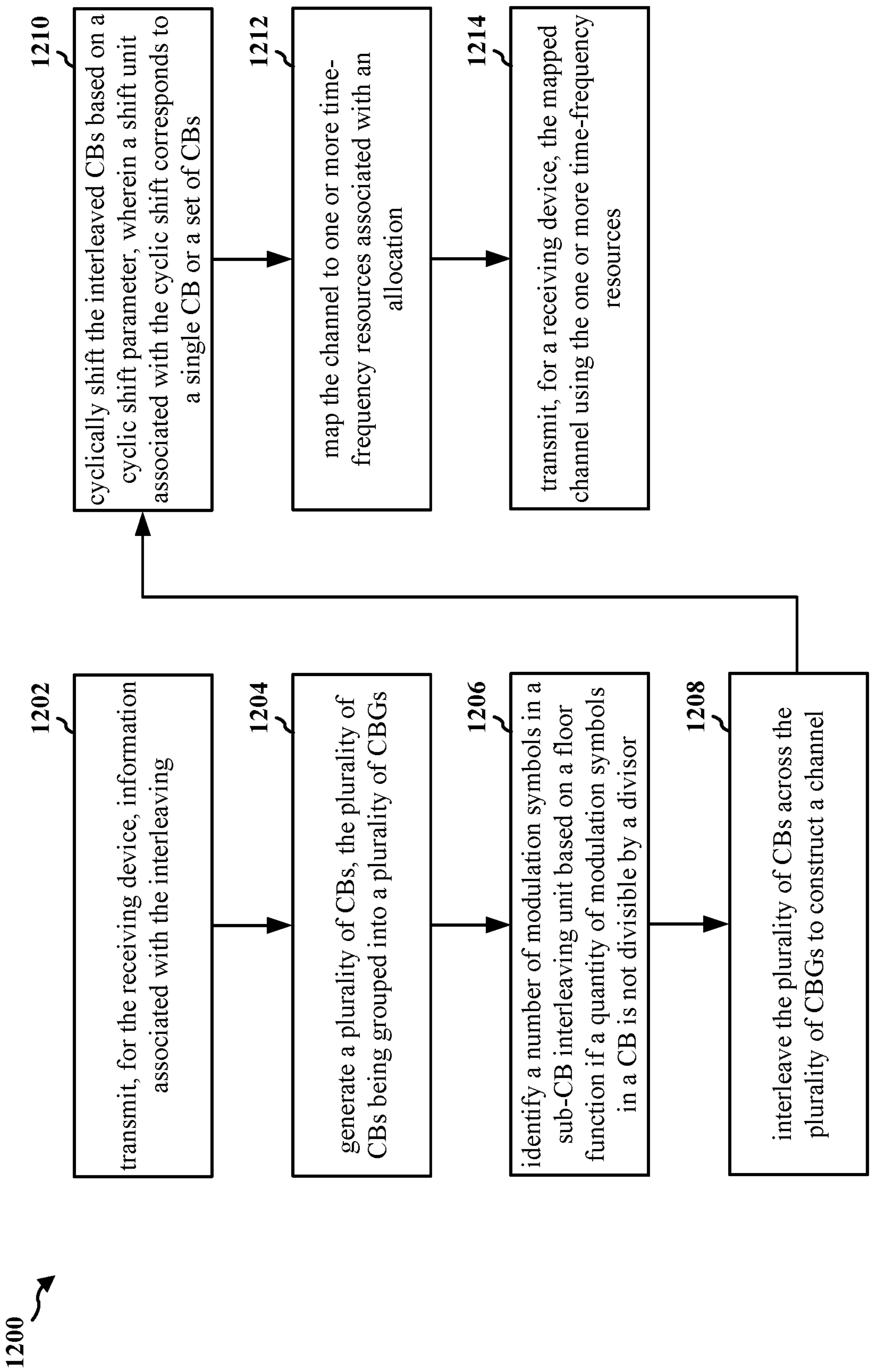
FIG. 12 is a flowchart of a method of wireless communication.

FIG. 12 is a flowchart 1200 of a method of wireless communication. The method may be performed by a transmitting device (e.g., the transmitting device 1002; the UE 104/350; the apparatus 1504; the base station 102/310; the network entity 1502/1602). At 1204, the transmitting device may generate a plurality of CBs. The plurality of CBs may be grouped into a plurality of CBGs. For example, 1204 may be performed by the component 198 in FIG. 15 or the component 199 in FIG. 16. Referring to FIG. 10, at 1008, the transmitting device 1002 may generate a plurality of CBs. For example, the diagram 704*a* in FIG. 7 illustrates a plurality of CBs generated by a transmitting device.

At 1208, the transmitting device may interleave the plurality of CBs across the plurality of CBGs to construct a channel. For example, 1208 may be performed by the component 198 in FIG. 15 or the component 199 in FIG. 16. Referring to FIG. 10, at 1012, the transmitting device 1002 may interleave the plurality of CBs across the plurality of CBGs to construct a channel. For example, the diagram 704*b* in FIG. 7 illustrates the plurality of CBs that have been interleaved across the plurality of CBGs by the transmitting device to construct a channel.

At 1212, the transmitting device may map the channel to one or more time-frequency resources associated with an allocation. For example, 1212 may be performed by the component 198 in FIG. 15 or the component 199 in FIG. 16. Referring to FIG. 10, at 1016, the transmitting device 1002 may map the channel to one or more time-frequency resources associated with an allocation. For example, the diagram 706*b* in FIG. 7 illustrates the channel including the interleaved plurality of CBs that has been mapped by the transmitting device to one or more ime-frequency resources associated with a DL allocation.

At 1214, the transmitting device may transmit, for a receiving device, the mapped channel using the one or more time-frequency resources. For example, 1214 may be performed by the component 198 in FIG. 15 or the component 199 in FIG. 16. Referring to FIG. 10, at 1018, the transmitting device 1002 may transmit, for a receiving device 1004, the mapped channel using the one or more time-frequency resources.

In one configuration, referring to FIG. 10, the plurality of CBs may be interleaved, at 1012, based on one of a sub-CB granularity, a single-CB granularity, or a multiple-CB granularity.

In one configuration, referring to FIG. 10, the plurality of CBs may be interleaved, at 1012, based on the sub-CB granularity. At 1206, the transmitting device may identify a number of modulation symbols in a sub-CB interleaving unit based on a floor function if a quantity of modulation symbols in a CB is not divisible by a divisor. For example, 1206 may be performed by the component 198 in FIG. 15 or the component 199 in FIG. 16. Referring to FIG. 10, at 1010, the transmitting device 1002 may identify a number of modulation symbols in a sub-CB interleaving unit based on a floor function if a quantity of modulation symbols in a CB is not divisible by a divisor.

In one configuration, referring to FIG. 10, the interleaving, at 1012, may be based on a preconfigured interleaver.

In one configuration, the preconfigured interleaver may include a row-column interleaver.

In one configuration, at 1210, the transmitting device may cyclically shift the interleaved CBs based on a cyclic shift parameter. A shift unit associated with the cyclic shift may correspond to a single CB or a set of CBs. For example, 1210 may be performed by the component 198 in FIG. 15 or the component 199 in FIG. 16. Referring to FIG. 10, at 1014, the transmitting device 1002 may cyclically shift the interleaved CBs based on a cyclic shift parameter. For example, the diagram 804*b* in FIG. 8 illustrates the interleaved CBs that have been cyclically shifted (e.g., rightward by 2 CBs) by the transmitting device based on a cyclic shift parameter.

In one configuration, the shift unit may be predetermined or based on at least one of a slot index, a bandwidth of the allocation, a number of CBs, or a number of CBGs.

In one configuration, referring to FIG. 10, the transmitting device 1002 may interleave the plurality of CBs, at 1012, and map the channel, at 1016, concurrently based on sequentially selecting a CBG in the plurality of CBGs for the mapping of the channel in a predetermined order. One of a next fraction of a CB, a next CB, or a next set of CBs in the selected CBG may be mapped to the one or more time-frequency resources. For example, the diagram 904*b* in FIG. 9 illustrates the channel including the interleaved CBs that have been mapped to time-frequency resources associated with a DL allocation based on sequentially selecting a CBG in the plurality of CBGs for the mapping of the channel in a predetermined order, where the interleaving and the channel mapping are performed concurrently.

In one configuration, the selecting of the CBG and the mapping of the channel may be based on a preconfigured manner.

In one configuration, the preconfigured manner may be one of a forward-inverse manner, a forward-forward manner, or an inverse-inverse manner.

In one configuration, referring to FIG. 10, the interleaving, at 1012, may be enabled or disabled based on one or more of an RRC configured parameter, a dynamic indication in a DCI message, a slot type, the allocation, or a bandwidth of the allocation.

In one configuration, the allocation may be associated with an SBFD operation.

In one configuration, the channel may be a PDSCH or a PUSCH.

In one configuration, at 1202, the transmitting device may transmit, for the receiving device, information associated with the interleaving. For example, 1202 may be performed by the component 198 in FIG. 15 or the component 199 in FIG. 16. Referring to FIG. 10, at 1006, the transmitting device 1002 may transmit, for the receiving device 1004, information associated with the interleaving.

Figure 13:
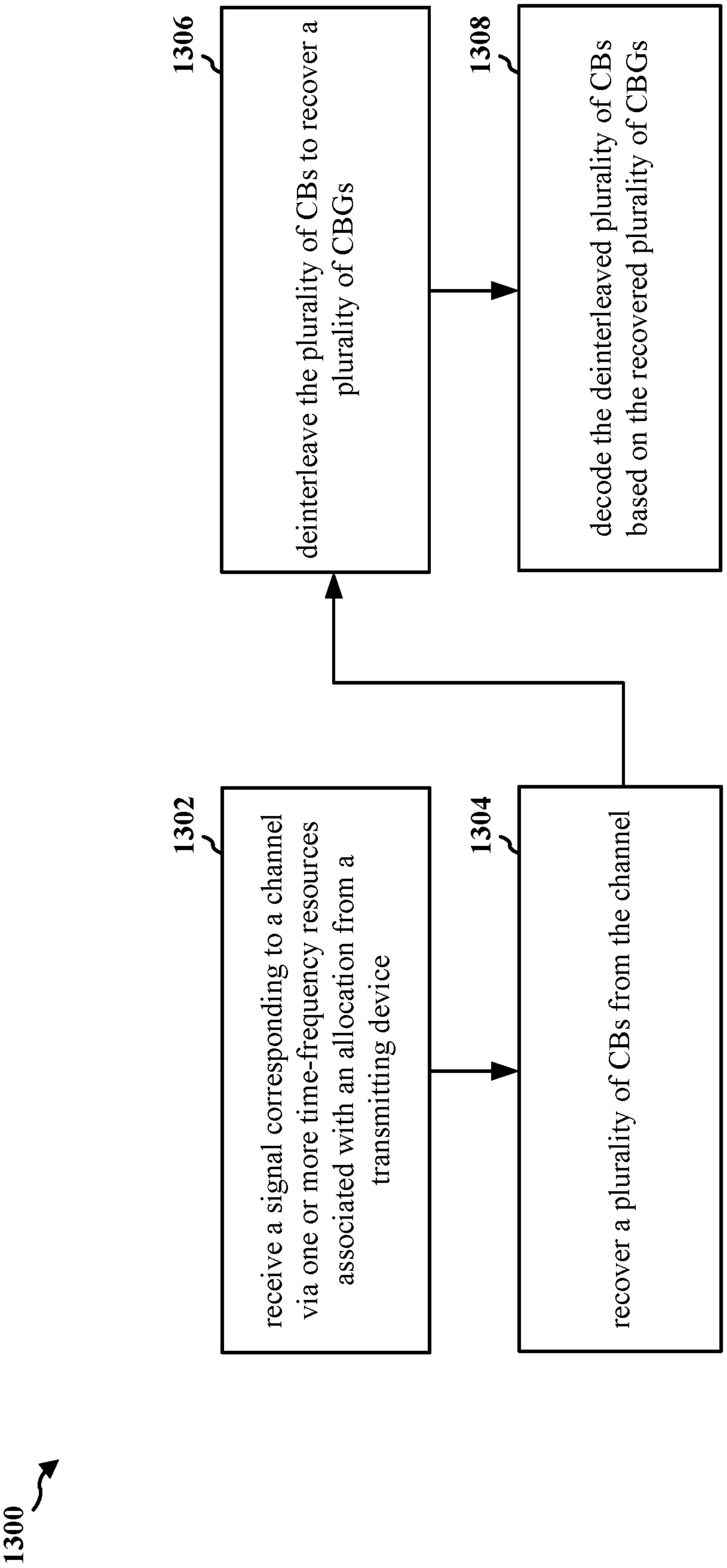
FIG. 13 is a flowchart of a method of wireless communication.

FIG. 13 is a flowchart 1300 of a method of wireless communication. The method may be performed by a receiving device (e.g., the receiving device 1004; the UE 104/350; the apparatus 1504; the base station 102/310; the network entity 1502/1602). At 1302, the receiving device may receive a signal corresponding to a channel via one or more time-frequency resources associated with an allocation from a transmitting device. For example, 1302 may be performed by the component 198 in FIG. 15 or the component 199 in FIG. 16. Referring to FIG. 10, at 1018, the receiving device 1004 may receive a signal corresponding to a channel via one or more time-frequency resources associated with an allocation from a transmitting device 1002.

At 1304, the receiving device may recover a plurality of CBs from the channel. For example, 1304 may be performed by the component 198 in FIG. 15 or the component 199 in FIG. 16. Referring to FIG. 10, at 1020, the receiving device 1004 may recover a plurality of CBs from the channel.

At 1306, the receiving device may deinterleave the plurality of CBs to recover a plurality of CBGs. For example, 1306 may be performed by the component 198 in FIG. 15 or the component 199 in FIG. 16. Referring to FIG. 10, at 1022, the receiving device 1004 may deinterleave the plurality of CBs to recover a plurality of CBGs.

At 1308, the receiving device may decode the deinterleaved plurality of CBs based on the recovered plurality of CBGs. For example, 1308 may be performed by the component 198 in FIG. 15 or the component 199 in FIG. 16. Referring to FIG. 10, at 1024, the receiving device 1004 may decode the deinterleaved plurality of CBs based on the recovered plurality of CBGs.

Figure 14:
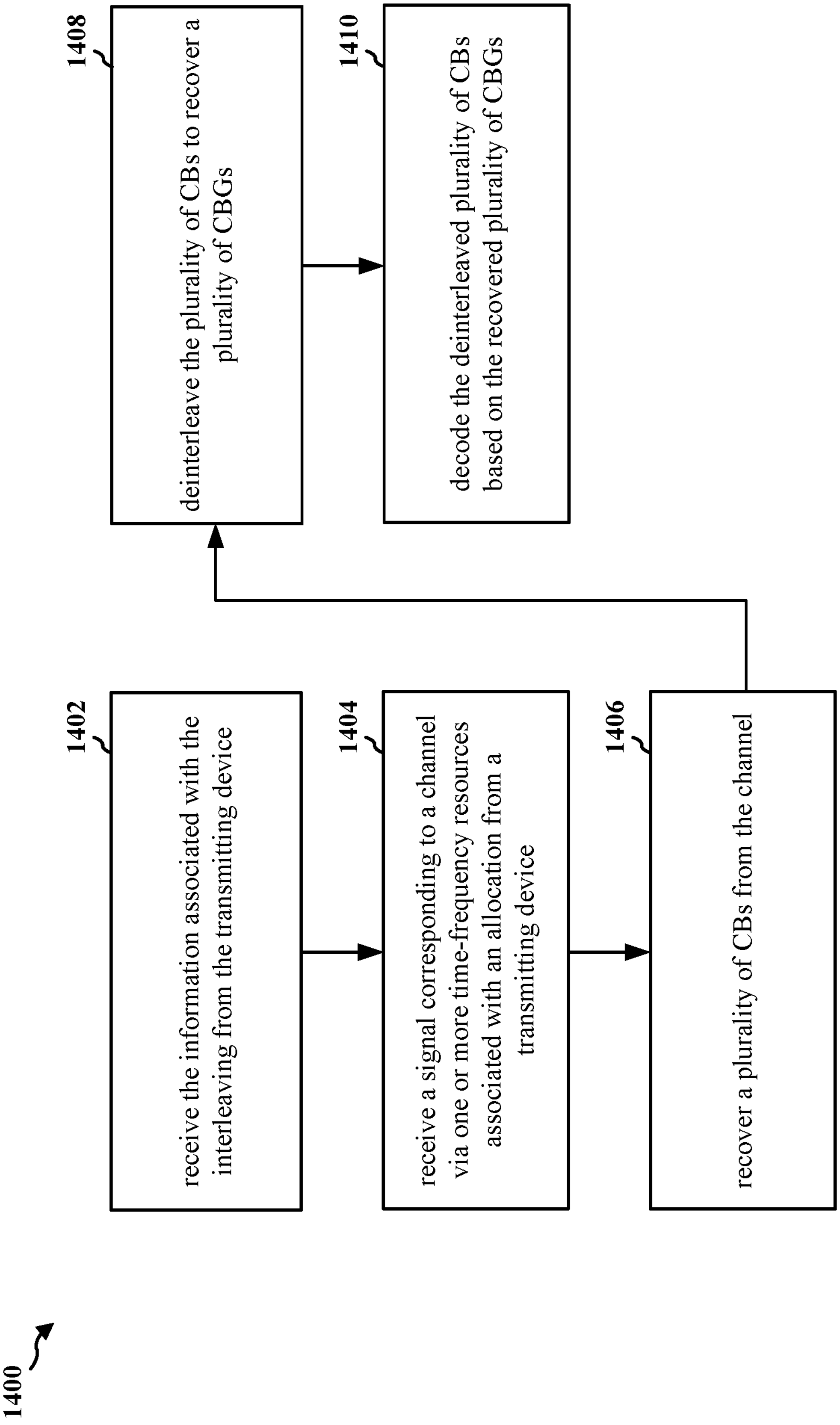
FIG. 14 is a flowchart of a method of wireless communication.

FIG. 14 is a flowchart 1400 of a method of wireless communication. The method may be performed by a receiving device (e.g., the receiving device 1004; the UE 104/350; the apparatus 1504; the base station 102/310; the network entity 1502/1602). At 1404, the receiving device may receive a signal corresponding to a channel via one or more time-frequency resources associated with an allocation from a transmitting device. For example, 1404 may be performed by the component 198 in FIG. 15 or the component 199 in FIG. 16. Referring to FIG. 10, at 1018, the receiving device 1004 may receive a signal corresponding to a channel via one or more time-frequency resources associated with an allocation from a transmitting device 1002.

At 1406, the receiving device may recover a plurality of CBs from the channel. For example, 1406 may be performed by the component 198 in FIG. 15 or the component 199 in FIG. 16. Referring to FIG. 10, at 1020, the receiving device 1004 may recover a plurality of CBs from the channel.

At 1408, the receiving device may deinterleave the plurality of CBs to recover a plurality of CBGs. For example, 1408 may be performed by the component 198 in FIG. 15 or the component 199 in FIG. 16. Referring to FIG. 10, at 1022, the receiving device 1004 may deinterleave the plurality of CBs to recover a plurality of CBGs.

At 1410, the receiving device may decode the deinterleaved plurality of CBs based on the recovered plurality of CBGs. For example, 1410 may be performed by the component 198 in FIG. 15 or the component 199 in FIG. 16. Referring to FIG. 10, at 1024, the receiving device 1004 may decode the deinterleaved plurality of CBs based on the recovered plurality of CBGs.

In one configuration, referring to FIG. 10, the plurality of CBs may be deinterleaved, at 1022, based on information associated with interleaving.

In one configuration, at 1402, the receiving device may receive the information associated with the interleaving from the transmitting device. For example, 1402 may be performed by the component 198 in FIG. 15 or the component 199 in FIG. 16. Referring to FIG. 10, at 1006, the receiving device 1004 may receive the information associated with the interleaving from the transmitting device 1002.

In one configuration, referring to FIG. 10, the plurality of CBs may be deinterleaved, at 1022, based on one of a sub-CB granularity, a single-CB granularity, or a multiple-CB granularity.

In one configuration, referring to FIG. 10, the deinterleaving, at 1022, may be enabled or disabled based on one or more of an RRC configured parameter, a dynamic indication in a DCI message, a slot type, the allocation, or a bandwidth of the allocation.

In one configuration, the allocation may be associated with an SBFD operation.

In one configuration, the channel may be a PDSCH or a PUSCH.

Figure 15:
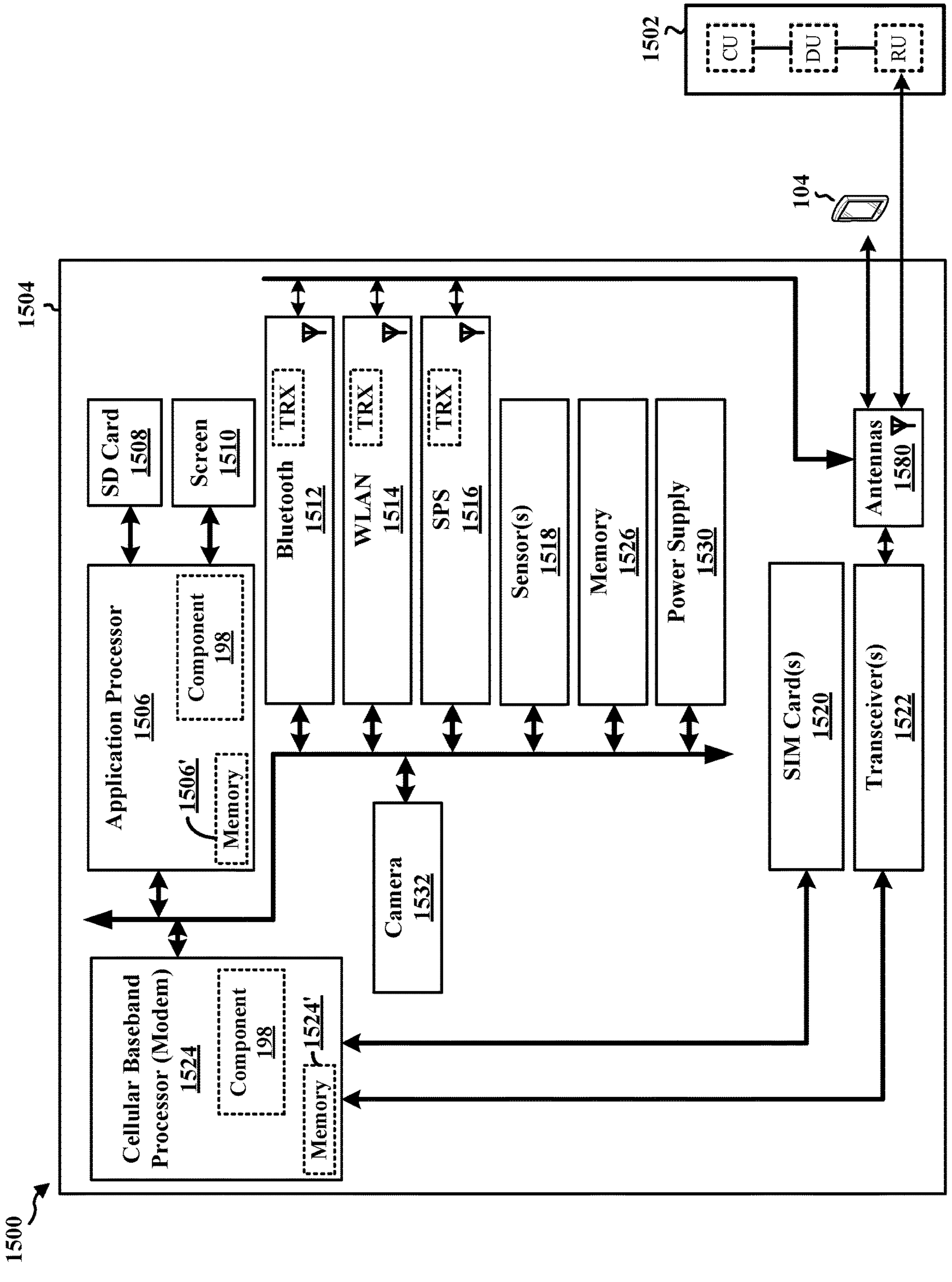
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, in configurations where the apparatus 1504 is the transmitting device, the component 198 may be configured to generate a plurality of CBs. The plurality of CBs may be grouped into a plurality of CBGs. The component 198 may be configured to interleave the plurality of CBs across the plurality of CBGs to construct a channel. The component 198 may be configured to map the channel to one or more time-frequency resources associated with an allocation. The component 198 may be configured to transmit, for a receiving device, the mapped channel using the one or more time-frequency resources. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, may include means for generating a plurality of CBs. The plurality of CBs may be grouped into a plurality of CBGs. The apparatus 1504, and in particular the cellular baseband processor 1524 and/or the application processor 1506, may include means for interleaving the plurality of CBs across the plurality of CBGs to construct a channel. The apparatus 1504, and in particular the cellular baseband processor 1524 and/or the application processor 1506, may include means for mapping the channel to one or more time-frequency resources associated with an allocation. The apparatus 1504, and in particular the cellular baseband processor 1524 and/or the application processor 1506, may include means for transmitting, for a receiving device, the mapped channel using the one or more time-frequency resources.

In one configuration, the plurality of CBs may be interleaved based on one of a sub-CB granularity, a single-CB granularity, or a multiple-CB granularity. In one configuration, the plurality of CBs may be interleaved based on the sub-CB granularity. The apparatus 1504, and in particular the cellular baseband processor 1524 and/or the application processor 1506, may include means for identifying a number of modulation symbols in a sub-CB interleaving unit based on a floor function if a quantity of modulation symbols in a CB is not divisible by a divisor. In one configuration, the means for interleaving may be based on a preconfigured interleaver. In one configuration, the preconfigured interleaver may include a row-column interleaver. In one configuration, the apparatus 1504, and in particular the cellular baseband processor 1524 and/or the application processor 1506, may include means for cyclically shifting the interleaved CBs based on a cyclic shift parameter. A shift unit associated with the cyclic shift may correspond to a single CB or a set of CBs. In one configuration, the shift unit may be predetermined or based on at least one of a slot index, a bandwidth of the allocation, a number of CBs, or a number of CBGs. In one configuration, the means for interleave the plurality of CBs and the means for mapping the channel may operate concurrently based on sequentially selecting a CBG in the plurality of CBGs for the mapping of the channel in a predetermined circular order. One of a next fraction of a CB, a next CB, or a next set of CBs in the selected CBG may be mapped to the one or more time-frequency resources. In one configuration, the selecting of the CBG and the mapping of the channel may be based on a preconfigured manner. In one configuration, the preconfigured manner may be one of a forward-inverse manner, a forward-forward manner, or an inverse-inverse manner. In one configuration, the means for interleaving may be enabled or disabled based on one or more of an RRC configured parameter, a dynamic indication in a DCI message, a slot type, the allocation, or a bandwidth of the allocation. In one configuration, the allocation may be associated with an SBFD operation. In one configuration, the channel may be a PDSCH or a PUSCH. In one configuration, the apparatus 1504, and in particular the cellular baseband processor 1524 and/or the application processor 1506, may include means for transmitting, for the receiving device, information associated with the interleaving.

In configurations where the apparatus 1504 is the receiving device, the component 198 may be configured to receive a signal corresponding to a channel via one or more time-frequency resources associated with an allocation from a transmitting device. The component 198 may be configured to recover a plurality of CBs from the channel. The component 198 may be configured to deinterleave the plurality of CBs to recover a plurality of CBGs. The component 198 may be configured to decode the deinterleaved plurality of CBs based on the recovered plurality of CBGs. In one configuration, the apparatus 1504, and in particular the cellular baseband processor 1524 and/or the application processor 1506, may include means for receiving a signal corresponding to a channel via one or more time-frequency resources associated with an allocation from a transmitting device. The apparatus 1504, and in particular the cellular baseband processor 1524 and/or the application processor 1506, may include means for recovering a plurality of CBs from the channel. The apparatus 1504, and in particular the cellular baseband processor 1524 and/or the application processor 1506, may include means for deinterleaving the plurality of CBs to recover a plurality of CBGs. The apparatus 1504, and in particular the cellular baseband processor 1524 and/or the application processor 1506, may include means for decoding the deinterleaved plurality of CBs based on the recovered plurality of CBGs.

In one configuration, the plurality of CBs may be deinterleaved based on information associated with interleaving. In one configuration, the apparatus 1504, and in particular the cellular baseband processor 1524 and/or the application processor 1506, may include means for receiving the information associated with the interleaving from the transmitting device. In one configuration, the plurality of CBs may be deinterleaved based on one of a sub-CB granularity, a single-CB granularity, or a multiple-CB granularity. In one configuration, the means for deinterleaving may be enabled or disabled based on one or more of an RRC configured parameter, a dynamic indication in a DCI message, a slot type, the allocation, or a bandwidth of the allocation. In one configuration, the allocation may be associated with an SBFD operation. In one configuration, the channel may be a PDSCH or a PUSCH.

The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
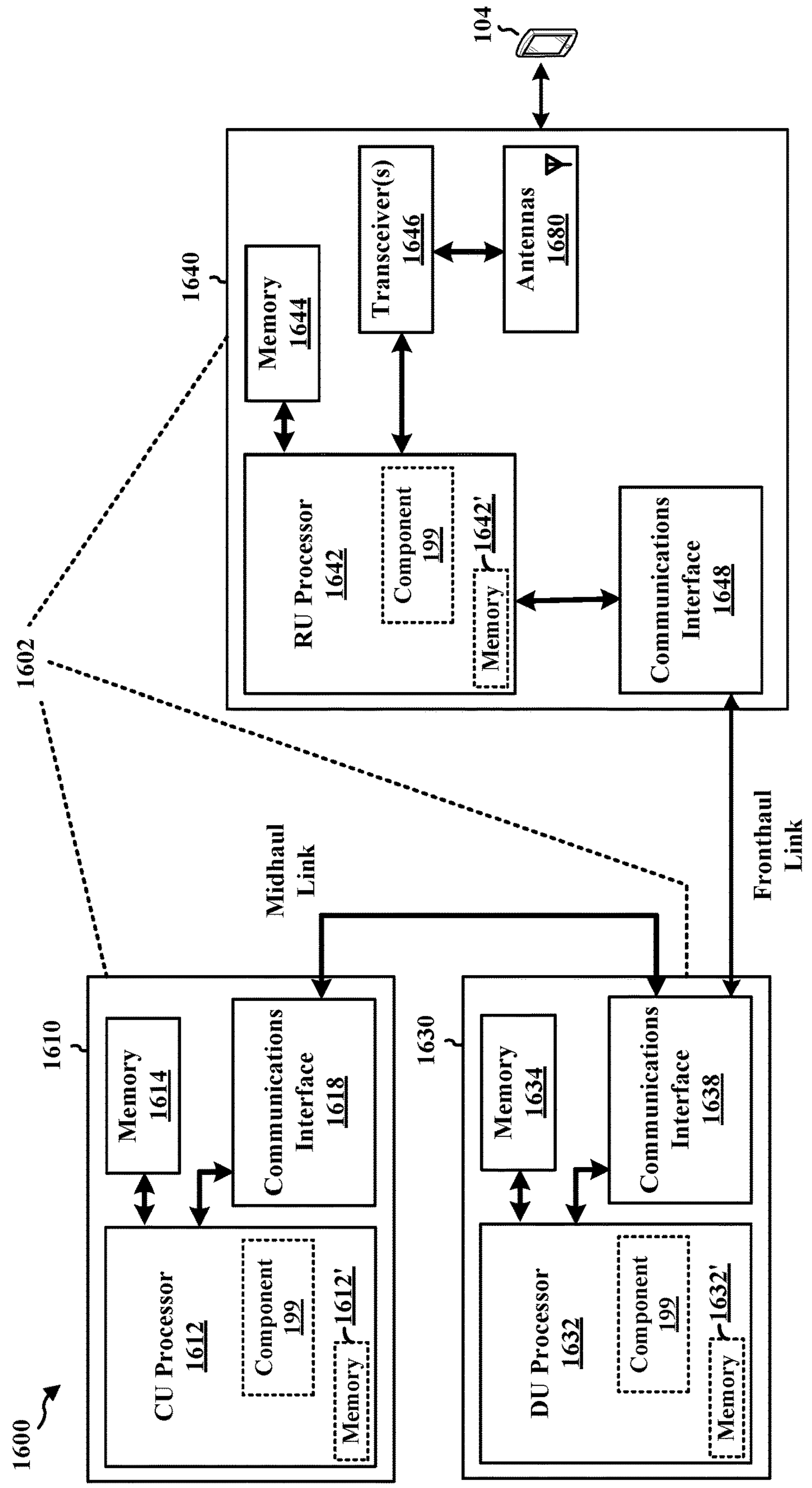
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632'. 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra.

The computer-readable medium/memory may also be used for storing data that is manipulated by the processor(s) when executing software.

As discussed supra, in configurations where the network entity 1602 is the receiving device, the component 199 may be configured to receive a signal corresponding to a channel via one or more time-frequency resources associated with an allocation from a transmitting device. The component 199 may be configured to recover a plurality of CBs from the channel. The component 199 may be configured to deinterleave the plurality of CBs to recover a plurality of CBGs. The component 199 may be configured to decode the deinterleaved plurality of CBs based on the recovered plurality of CBGs. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 may include means for receiving a signal corresponding to a channel via one or more time-frequency resources associated with an allocation from a transmitting device. The network entity 1602 may include means for recovering a plurality of CBs from the channel. The network entity 1602 may include means for deinterleaving the plurality of CBs to recover a plurality of CBGs. The network entity 1602 may include means for decoding the deinterleaved plurality of CBs based on the recovered plurality of CBGs.

In one configuration, the plurality of CBs may be deinterleaved based on information associated with interleaving. In one configuration, the network entity 1602 may include means for receiving the information associated with the interleaving from the transmitting device. In one configuration, the plurality of CBs may be deinterleaved based on one of a sub-CB granularity, a single-CB granularity, or a multiple-CB granularity. In one configuration, the means for deinterleaving may be enabled or disabled based on one or more of an RRC configured parameter, a dynamic indication in a DCI message, a slot type, the allocation, or a bandwidth of the allocation. In one configuration, the allocation may be associated with an SBFD operation. In one configuration, the channel may be a PDSCH or a PUSCH.

In configurations where the network entity 1602 is the transmitting device, the component 199 may be configured to generate a plurality of CBs. The plurality of CBs may be grouped into a plurality of CBGs. The component 199 may be configured to interleave the plurality of CBs across the plurality of CBGs to construct a channel. The component 199 may be configured to map the channel to one or more time-frequency resources associated with an allocation. The component 199 may be configured to transmit, for a receiving device, the mapped channel using the one or more time-frequency resources. In one configuration, the network entity 1602 may include means for generating a plurality of CBs. The plurality of CBs may be grouped into a plurality of CBGs. The network entity 1602 may include means for interleaving the plurality of CBs across the plurality of CBGs to construct a channel. The network entity 1602 may include means for mapping the channel to one or more time-frequency resources associated with an allocation. The network entity 1602 may include means for transmitting, for a receiving device, the mapped channel using the one or more time-frequency resources.

In one configuration, the plurality of CBs may be interleaved based on one of a sub-CB granularity, a single-CB granularity, or a multiple-CB granularity. In one configuration, the plurality of CBs may be interleaved based on the sub-CB granularity. The network entity 1602 may include means for identifying a number of modulation symbols in a sub-CB interleaving unit based on a floor function if a quantity of modulation symbols in a CB is not divisible by a divisor. In one configuration, the means for interleaving may be based on a preconfigured interleaver. In one configuration, the preconfigured interleaver may include a row-column interleaver. In one configuration, the network entity 1602 may include means for cyclically shifting the interleaved CBs based on a cyclic shift parameter. A shift unit associated with the cyclic shift may correspond to a single CB or a set of CBs. In one configuration, the shift unit may be predetermined or based on at least one of a slot index, a bandwidth of the allocation, a number of CBs, or a number of CBGs. In one configuration, the means for interleave the plurality of CBs and the means for mapping the channel may operate concurrently based on sequentially selecting a CBG in the plurality of CBGs for the mapping of the channel in a predetermined circular order. One of a next fraction of a CB, a next CB, or a next set of CBs in the selected CBG may be mapped to the one or more time-frequency resources. In one configuration, the selecting of the CBG and the mapping of the channel may be based on a preconfigured manner. In one configuration, the preconfigured manner may be one of a forward-inverse manner, a forward-forward manner, or an inverse-inverse manner. In one configuration, the means for interleaving may be enabled or disabled based on one or more of an RRC configured parameter, a dynamic indication in a DCI message, a slot type, the allocation, or a bandwidth of the allocation. In one configuration, the allocation may be associated with an SBFD operation. In one configuration, the channel may be a PDSCH or a PUSCH. In one configuration, the network entity 1602 may include means for transmitting, for the receiving device, information associated with the interleaving.

The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-16, a transmitting device may generate a plurality of CBs. The plurality of CBs may be grouped into a plurality of CBGs. The transmitting device may interleave the plurality of CBs across the plurality of CBGs to construct a channel. The transmitting device may map the channel to one or more time-frequency resources associated with an allocation. The transmitting device may transmit, for a receiving device, the mapped channel using the one or more time-frequency resources. The receiving device may recover a plurality of CBs from the channel. The receiving device may deinterleave the plurality of CBs to recover a plurality of CBGs. The receiving device may decode the deinterleaved plurality of CBs based on the recovered plurality of CBGs. Accordingly, after the CBs are allocated to the resources of the allocation, the multiple CBGs may be spread evenly in the resources across the bandwidth of the allocation. As a result, the multiple CBGs may not suffer from uneven error rates that may be caused by the resources having different closeness to the subband edge.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a transmitting device, including generating a plurality of CBs, the plurality of CBs being grouped into a plurality of CBGs; interleaving the plurality of CBs across the plurality of CBGs to construct a channel; mapping the channel to one or more time-frequency resources associated with an allocation; and transmitting, for a receiving device, the mapped channel using the one or more time-frequency resources.

Aspect 2 is the method of aspect 1, where the plurality of CBs is interleaved based on one of a sub-CB granularity, a single-CB granularity, or a multiple-CB granularity.

Aspect 3 is the method of aspect 2, where the plurality of CBs is interleaved based on the sub-CB granularity, and the method further includes: identifying a number of modulation symbols in a sub-CB interleaving unit based on a floor function if a quantity of modulation symbols in a CB is not divisible by a divisor.

Aspect 4 is the method of any of aspects 1 to 3, where the interleaving is based on a preconfigured interleaver.

Aspect 5 is the method of aspect 4, where the preconfigured interleaver includes a row-column interleaver.

Aspect 6 is the method of any of aspects 1 to 5, further including: cyclically shifting the interleaved CBs based on a cyclic shift parameter, where a shift unit associated with the cyclic shift corresponds to a single CB or a set of CBs.

Aspect 7 is the method of aspect 6, where the shift unit is predetermined or based on at least one of a slot index, a bandwidth of the allocation, a number of CBs, or a number of CBGs.

Aspect 8 is the method of any of aspects 1, 6, and 7, where the interleaving the plurality of CBs and the mapping the channel are performed concurrently based on sequentially selecting a CBG in the plurality of CBGs for the mapping of the channel in a predetermined order, where one of a next fraction of a CB, a next CB, or a next set of CBs in the selected CBG is mapped to the one or more time-frequency resources.

Aspect 9 is the method of aspect 8, where the selecting of the CBG and the mapping of the channel are based on a preconfigured manner.

Aspect 10 is the method of aspect 9, where the preconfigured manner is one of a forward-inverse manner, a forward-forward manner, or an inverse-inverse manner.

Aspect 11 is the method of any of aspects 1 to 10, where the interleaving is enabled or disabled based on one or more of an RRC configured parameter, a dynamic indication in a DCI message, a slot type, the allocation, or a bandwidth of the allocation.

Aspect 12 is the method of any of aspects 1 to 11, where the allocation is associated with an SBFD operation.

Aspect 13 is the method of any of aspects 1 to 12, where the channel is a PDSCH or a PUSCH.

Aspect 14 is the method of any of aspects 1 to 13, further including: transmitting, for the receiving device, information associated with the interleaving.

Aspect 15 is a method of wireless communication at a receiving device, including receiving a signal corresponding to a channel via one or more time-frequency resources associated with an allocation from a transmitting device; recovering a plurality of CBs from the channel; deinterleaving the plurality of CBs to recover a plurality of CBGs; and decoding the deinterleaved plurality of CBs based on the recovered plurality of CBGs.

Aspect 16 is the method of aspect 15, where the plurality of CBs is deinterleaved based on information associated with interleaving.

Aspect 17 is the method of aspect 16, further including: receiving the information associated with the interleaving from the transmitting device.

Aspect 18 is the method of any of aspects 15 to 17, where the plurality of CBs is deinterleaved based on one of a sub-CB granularity, a single-CB granularity, or a multiple-CB granularity.

Aspect 19 is the method of any of aspects 15 to 18, where the deinterleaving is enabled or disabled based on one or more of an RRC configured parameter, a dynamic indication in a DCI message, a slot type, the allocation, or a bandwidth of the allocation.

Aspect 20 is the method of any of aspects 15 to 19, where the allocation is associated with an SBFD operation.

Aspect 21 is the method of any of aspects 15 to 20, where the channel is a PDSCH or a PUSCH.

Aspect 22 is an apparatus for wireless communication including at least one processor coupled to a memory and, based at least in part on information stored in the memory, the at least one processor is configured to implement a method as in any of aspects 1 to 21.

Aspect 23 may be combined with aspect 22 and further includes a transceiver coupled to the at least one processor.

Aspect 24 is an apparatus for wireless communication including means for implementing any of aspects 1 to 21.

Aspect 25 is a non-transitory computer-readable storage medium storing computer executable code, where the code when executed by a processor causes the processor to implement any of aspects 1 to 21.

Various aspects have been described herein. These and other aspects are within the scope of the following claims.

What is claimed is:

1. An apparatus for wireless communication at a transmitting device, comprising:
- memory; and
- at least one processor coupled to the memory and, based at least in part on information stored in the memory, the at least one processor is configured to:
  - generate a plurality of code blocks (CBs), the plurality of CBs being grouped into a plurality of code block groups (CBGs);
  - interleave, based on a number of modulation symbols in a sub-CB interleaving unit, the plurality of CBs across the plurality of CBGs to construct a channel, wherein the number of modulation symbols in the sub-CB interleaving unit is based on a floor function if a quantity of modulation symbols in a CB is not divisible by at least one configured divisor, wherein the at least one configured divisor is greater than one;
  - map the channel to one or more time-frequency resources associated with an allocation; and
  - transmit, for a receiving device, the mapped channel using the one or more time-frequency resources.

2. The apparatus of claim 1, wherein the plurality of CBs is interleaved based on a sub-CB granularity, and the at least one processor is further configured to:
- identify the number of modulation symbols in the sub-CB interleaving unit based on the floor function if the quantity of modulation symbols in the CB is not divisible by the at least one configured divisor.

3. The apparatus of claim 1, wherein the interleaving is based on a preconfigured interleaver.

4. The apparatus of claim 3, wherein the preconfigured interleaver includes a row-column interleaver.

5. The apparatus of claim 1, the at least one processor being further configured to:
- cyclically shift the interleaved CBs based on a cyclic shift parameter, wherein a shift unit associated with the cyclic shift corresponds to a single CB or a set of CBs.

6. The apparatus of claim 5, wherein the shift unit is predetermined or based on at least one of a slot index, a bandwidth of the allocation, a number of CBs, or a number of CBGs.

7. The apparatus of claim 1, wherein the at least one processor is configured to interleave the plurality of CBs and map the channel concurrently based on sequentially selecting a CBG in the plurality of CBGs for the mapping of the channel in a predetermined order, wherein one of a next fraction of a CB, a next CB, or a next set of CBs in the selected CBG is mapped to the one or more time-frequency resources.

8. The apparatus of claim 7, wherein the selecting of the CBG and the mapping of the channel are based on a preconfigured manner.

9. The apparatus of claim 8, wherein the preconfigured manner is one of a forward-inverse manner, a forward-forward manner, or an inverse-inverse manner.

10. The apparatus of claim 1, wherein the interleaving is enabled or disabled based on one or more of a radio resource control (RRC) configured parameter, a dynamic indication in a downlink control information (DCI) message, a slot type, the allocation, or a bandwidth of the allocation.

11. The apparatus of claim 1, wherein the allocation is associated with a subband full-duplex (SBFD) operation.

12. The apparatus of claim 1, wherein the channel is a physical downlink shared channel (PDSCH) or a physical uplink shared channel (PUSCH).

13. The apparatus of claim 1, the at least one processor being further configured to:
- transmit, for the receiving device, information associated with the interleaving.

14. The apparatus of claim 1, further comprising a transceiver coupled to the at least one processor, the transceiver being configured to transmit the mapped channel using the one or more time-frequency resources.

15. A method of wireless communication at a transmitting device, comprising:
- generating a plurality of code blocks (CBs), the plurality of CBs being grouped into a plurality of code block groups (CBGs);
- interleaving, based on a number of modulation symbols in a sub-CB interleaving unit, the plurality of CBs across the plurality of CBGs to construct a channel, wherein the number of modulation symbols in the sub-CB interleaving unit is based on a floor function if a quantity of modulation symbols in a CB is not divisible by at least one configured divisor, wherein the at least one configured divisor is greater than one;
- mapping the channel to one or more time-frequency resources associated with an allocation; and transmitting, for a receiving device, the mapped channel using the one or more time-frequency resources.

16. The method of claim 15, wherein the plurality of CBs is interleaved based on a sub-CB granularity, and the method further comprises:

identifying the number of modulation symbols in the sub-CB interleaving unit based on the floor function if the quantity of modulation symbols in the CB is not divisible by the at least one configured divisor.

17. An apparatus for wireless communication at a receiving device, comprising:

memory; and at least one processor coupled to the memory and, based at least in part on information stored in the memory, the at least one processor is configured to:

receive a signal corresponding to a channel via one or more time-frequency resources associated with an allocation from a transmitting device;

recover a plurality of code blocks (CBs) from the channel, wherein the plurality of CBs is interleaved based on a number of modulation symbols in a sub-CB interleaving unit, and wherein the number of modulation symbols in the sub-CB interleaving unit is based on a floor function if a quantity of modulation symbols in a CB is not divisible by at least one configured divisor, wherein the at least one configured divisor is greater than one;

deinterleave the plurality of CBs to recover a plurality of code block groups (CBGs); and decode the deinterleaved plurality of CBs based on the recovered plurality of CBGs.

18. The apparatus of claim 17, wherein the plurality of CBs is deinterleaved based on information associated with interleaving.

19. The apparatus of claim 18, the at least one processor being configured to:

receive the information associated with the interleaving from the transmitting device.

20. The apparatus of claim 17, wherein the deinterleaving is enabled or disabled based on one or more of a radio resource control (RRC) configured parameter, a dynamic indication in a downlink control information (DCI) message, a slot type, the allocation, or a bandwidth of the allocation.

21. The apparatus of claim 17, wherein the allocation is associated with a subband full-duplex (SBFD) operation.

22. The apparatus of claim 17, wherein the channel is a physical downlink shared channel (PDSCH) or a physical uplink shared channel (PUSCH).

23. The apparatus of claim 17, further comprising a transceiver coupled to the at least one processor, the transceiver being configured to receive the signal corresponding to the channel.

24. A method of wireless communication at a receiving device, comprising:

receiving a signal corresponding to a channel via one or more time-frequency resources associated with an allocation from a transmitting device;

recovering a plurality of code blocks (CBs) from the channel, wherein the plurality of CBs is interleaved based on a number of modulation symbols in a sub-CB interleaving unit, and wherein the number of modulation symbols in the sub-CB interleaving unit is based on a floor function if a quantity of modulation symbols in a CB is not divisible by at least one configured divisor, wherein the at least one configured divisor is greater than one;

deinterleaving the plurality of CBs to recover a plurality of code block groups (CBGs); and decoding the deinterleaved plurality of CBs based on the recovered plurality of CBGs.

25. The method of claim 24, wherein the plurality of CBs is deinterleaved based on information associated with interleaving.

26. The method of claim 25, further comprising:

receiving the information associated with the interleaving from the transmitting device.

27. The apparatus of claim 1, wherein the at least one configured divisor corresponds to a single divisor that equals to two.

28. The method of claim 15, wherein the at least one configured divisor corresponds to a single divisor that equals to two.

29. The apparatus of claim 17, wherein the at least one configured divisor corresponds to a single divisor that equals to two.

30. The method of claim 24, wherein the at least one configured divisor corresponds to a single divisor that equals to two.

* * * * *